United States Patent
Gniadek

(10) Patent No.: US 10,330,869 B2
(45) Date of Patent: Jun. 25, 2019

(54) BAYONET LOCK MPO CONNECTOR

(71) Applicant: Senko Advanced Components, Inc., Marlborough, MA (US)

(72) Inventor: Jeffrey Gniadek, Northbridge, MA (US)

(73) Assignee: Senko Advanced Components, Inc, Marlborough, MA (US)

( * ) Notice: Subject to any disclaimer, the term of this patent is extended or adjusted under 35 U.S.C. 154(b) by 0 days.

(21) Appl. No.: 15/670,157

(22) Filed: Aug. 7, 2017

(65) Prior Publication Data
US 2017/0351040 A1    Dec. 7, 2017

Related U.S. Application Data

(63) Continuation of application No. 14/874,670, filed on Oct. 5, 2015, now Pat. No. 9,726,831, which is a (Continued)

(51) Int. Cl.
   *G02B 6/38* (2006.01)
   *G02B 6/00* (2006.01)

(52) U.S. Cl.
   CPC ......... *G02B 6/3891* (2013.01); *G02B 6/3821* (2013.01); *G02B 6/3885* (2013.01); (Continued)

(58) Field of Classification Search
   CPC ....... G02B 6/38; G02B 6/3821; G02B 6/3891 (Continued)

(56) References Cited

U.S. PATENT DOCUMENTS

| 4,844,570 A | * | 7/1989 | Tanabe | G02B 6/3825 |
| | | | | 385/55 |
| 5,029,973 A | * | 7/1991 | Rink | F16L 37/113 |
| | | | | 285/396 |

(Continued)

FOREIGN PATENT DOCUMENTS

| DE | 1991473 | 9/2016 |
| WO | WO0005610 A1 | 2/2000 |

OTHER PUBLICATIONS

PCT/US16/39599ISR, Sep. 22, 2016, ISR.
PCT/US16/39599OP, dated Jan. 12, 2018, Opinion.
European Search Report.

*Primary Examiner* — Kaveh C Kianni
(74) *Attorney, Agent, or Firm* — Edward S. Jarmolowicz, Esq

(57) ABSTRACT

Optical fiber connectors for MT/MPO type ferrule assemblies are disclosed, having an overall connector length less than about 32 mm, for example, an overall length of about 18.5 mm for non-reinforced optical fiber cables, and an overall length of about 23.5 mm for reinforced optical fiber cables. In one embodiment, a connector comprises a ferrule assembly, and a housing coupled to the ferrule assembly and configured to couple to an adapter corresponding to the ferrule assembly. The connector further includes a lock coupled to the housing and configured to rotate so as to lock and unlock the housing from said adapter. An interface member coupled to the housing may include a stop configured to limit rotation of the lock. The interface member may include a reinforcement portion for reinforcing optical fiber cables.

9 Claims, 28 Drawing Sheets

Related U.S. Application Data continuation-in-part of application No. 14/790,077, filed on Jul. 2, 2015.

(52) U.S. Cl.
CPC .......... *G02B 6/3869* (2013.01); *G02B 6/3893* (2013.01); *G02B 6/3897* (2013.01)

(58) Field of Classification Search
USPC .......................................................... 385/78
See application file for complete search history.

(56) References Cited

U.S. PATENT DOCUMENTS

| | | | | |
|---|---|---|---|---|
| 5,031,981 A * | 7/1991 | Peterson | G02B 6/3887 | 385/56 |
| 5,074,637 A * | 12/1991 | Rink | G02B 6/3891 | 385/56 |
| 5,280,552 A * | 1/1994 | Yokoi | G02B 6/3825 | 385/69 |
| 5,447,464 A * | 9/1995 | Franklin | B24B 19/226 | 451/28 |
| 5,682,451 A * | 10/1997 | Lee | G02B 6/3812 | 385/56 |
| 6,168,318 B1 * | 1/2001 | Soeda | G02B 6/3834 | 385/78 |
| 6,186,670 B1 * | 2/2001 | Austin | G02B 6/3825 | 385/55 |
| 6,186,671 B1 | 2/2001 | Austin | | |
| 6,200,040 B1 * | 3/2001 | Edwards | G02B 6/3806 | 385/134 |
| 6,464,402 B1 * | 10/2002 | Andrews | G02B 6/381 | 385/134 |
| 6,632,102 B1 * | 10/2003 | Gherardini | G02B 6/3887 | 439/352 |
| 7,241,056 B1 * | 7/2007 | Kuffel | G02B 6/3806 | 385/60 |
| 7,654,748 B2 | 2/2010 | Kuffel | | |
| 8,556,520 B2 * | 10/2013 | Elenbaas | G02B 6/3847 | 385/53 |
| 2001/0010741 A1 * | 8/2001 | Hizuka | G02B 6/3825 | 385/55 |
| 2003/0007729 A1 | 1/2003 | Perry | | |
| 2003/0063867 A1 * | 4/2003 | McDonald | G02B 6/3869 | 385/78 |
| 2003/0147598 A1 * | 8/2003 | McPhee | G02B 6/3843 | 385/78 |
| 2003/0161586 A1 * | 8/2003 | Hirabayashi | G02B 6/3851 | 385/78 |
| 2005/0213897 A1 * | 9/2005 | Palmer | G02B 6/3833 | 385/95 |
| 2007/0111582 A1 * | 5/2007 | Yoshimori | G02B 6/389 | 439/348 |
| 2007/0286563 A1 * | 12/2007 | Wagner | G02B 6/3802 | 385/134 |
| 2008/0026647 A1 * | 1/2008 | Boehnlein | G02B 23/2476 | 439/882 |
| 2009/0148101 A1 * | 6/2009 | Lu | G02B 6/3816 | 385/56 |
| 2010/0215322 A1 | 8/2010 | Matsumoto et al. | | |
| 2015/0177467 A1 | 6/2015 | Gniadek et al. | | |

* cited by examiner

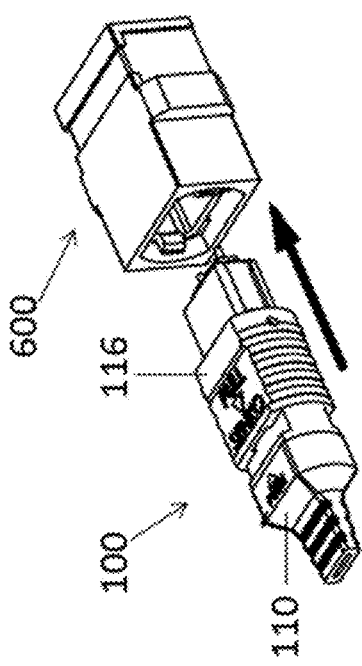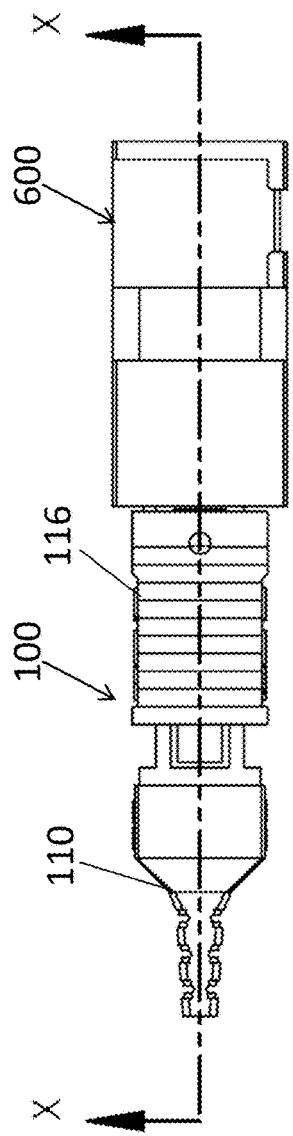
FIG. 9
(PRIOR ART)
FIG. 10
(PRIOR ART)

FIG. 11A (PRIOR ART) SECTION X-X JUST BEFORE LATCHING

SECTION X-X
LATCHED CONDITION

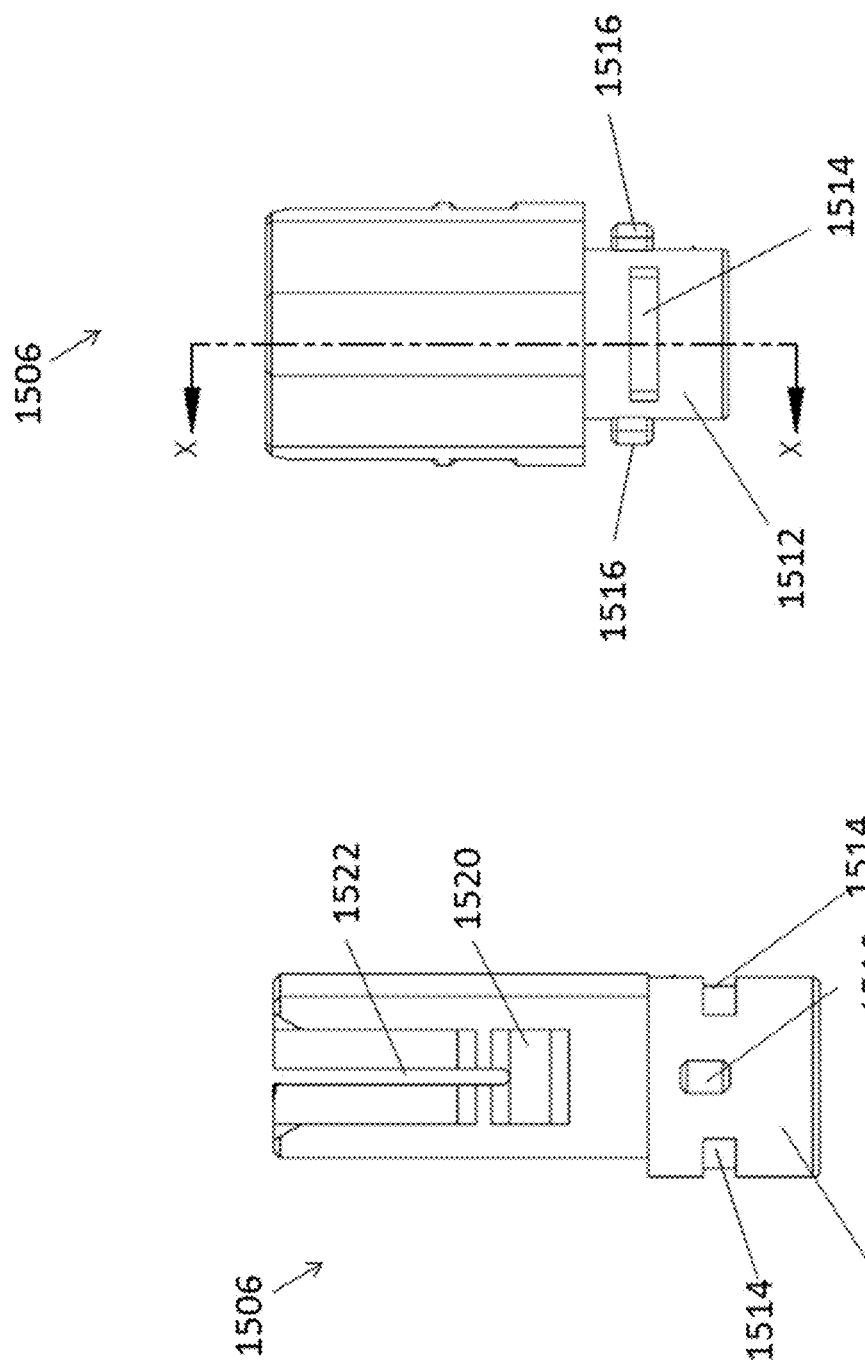

UNLOCKED

LOCKED

UNLOCKED

LOCKED

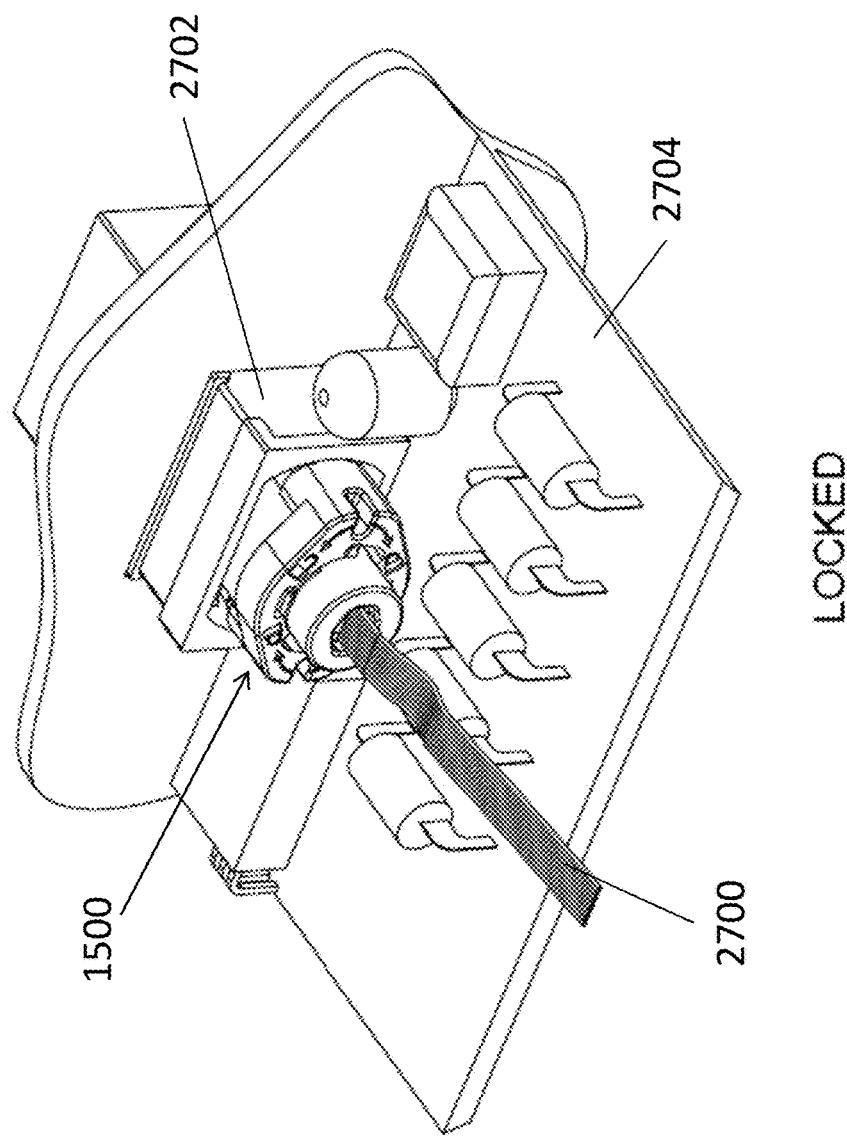

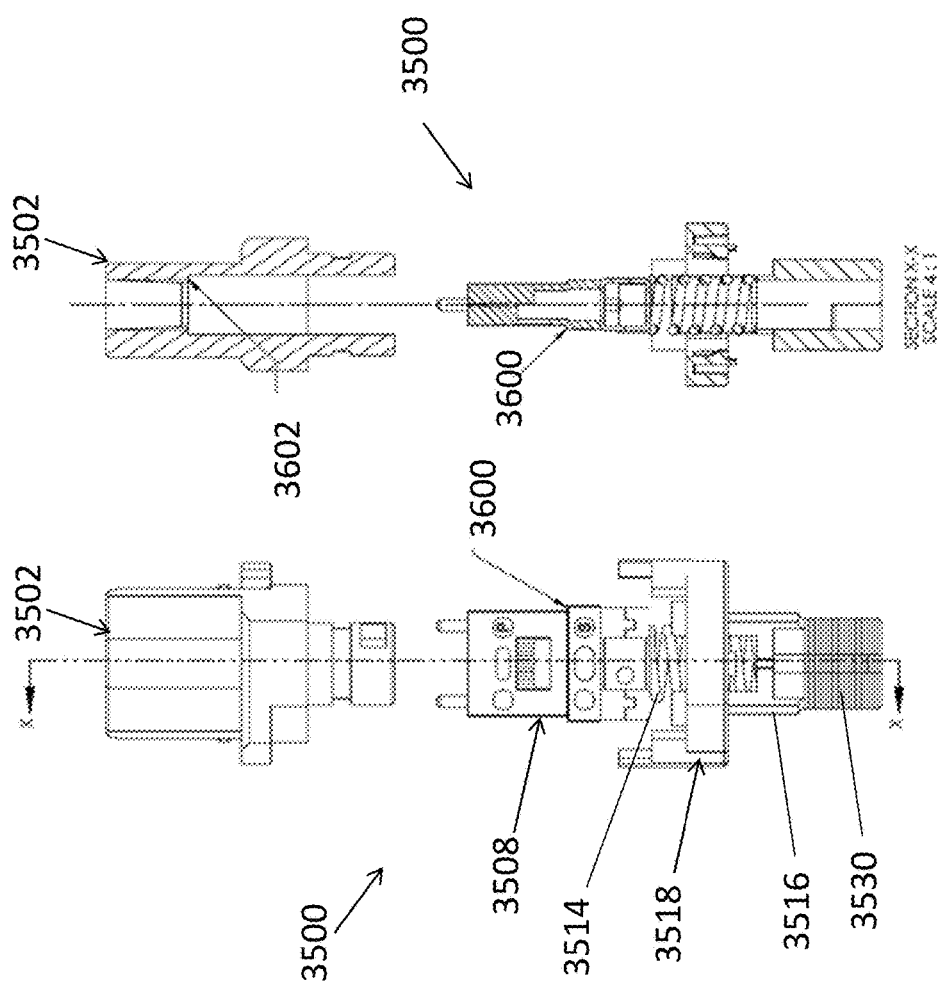

BAYONET LOCK MPO CONNECTOR

CROSS-REFERENCE TO RELATED APPLICATIONS

This application is a continuation of U.S. patent application Ser. No. 14/874,670, filed Oct. 5, 2015, which is a continuation-in-part application of U.S. patent application Ser. No. 14/790,077 filed on Jul. 2, 2015 both of which are incorporated herein by reference in their entirety.

BACKGROUND

The present disclosure relates generally to optical fiber connectors and systems, and specifically to MPO (Multi-fiber Push On) type optical fiber connectors having a compact design.

Fiber optics have become the standard cabling medium used by data centers to meet the growing needs for data volume, transmission speeds, and low losses. An optical fiber connector is a mechanical device disposed at an end of an optical fiber, and acts as a connector of optical paths, for example when optical fibers are joined to each other. An optical fiber connector may be coupled with an adapter to connect an optical fiber cable to other optical fiber cables or devices. An adapter generally includes a housing, or portion of a housing, having at least one port which is configured to receive and hold a connector to facilitate the optical connection of one connector to another connector or other device.

An MPO connector is a multi-fiber connector defined by industry standards. A conventional MPO connector has many constituent parts and a push/pull locking and unlocking mechanism, resulting in a relatively long connector design that wastes too much space, and which may not be sufficiently small for use in certain applications. Moreover, conventional MPO connectors are composed of many constituent parts, increasing the cost of materials and labor, as well as the complexity of assembly. Accordingly, there is a need for MPO type optical fiber connectors that have a more compact design than conventional MPO connectors.

SUMMARY

Embodiments disclosed herein address the aforementioned shortcomings of conventional MPO connectors by providing MPO connectors having a lock, such as a bayonet lock or a locking ring, and less constituent parts, resulting in a shorter length than conventional MPO connectors. For example, in one embodiment, an MPO connector may have a length less than about 37 mm. For example, the length of the MPO connector may be about 18.5 mm for a bare (non-reinforced) ribbon type fiber cable. By contrast, a conventional MPO connector typically has a length of about 37 mm. In another embodiment, the length of the MPO connector may be about 23.5 mm for a reinforced cable, prior to attachment of the reinforced cable and prior to addition of a strain relief. By contrast, a conventional MPO connector for a reinforced cable has a length of about 31 mm prior to attachment of the reinforced cable and prior to addition of a strain relief.

Other advantages of embodiments disclosed herein include lower cost of materials and assembly, and compatibility with conventional MPO adapters that are in use in various applications. Furthermore, various embodiments of MPO connectors disclosed herein are compatible with MPO type ferrule assemblies that are in use in various applications. Thus, various embodiments disclosed herein are backwards compatible with conventional MPO assemblies and adapters.

According to one aspect, there is disclosed a connector comprising a ferrule assembly, a housing coupled to the ferrule assembly and configured to couple to an adapter corresponding to the ferrule assembly, and a lock coupled to the housing and configured to rotate so as to lock and unlock the housing from said adapter. The ferrule assembly may be an MT/MPO ferrule assembly or an MPO ferrule assembly. The lock may be a ring configured to rotate about the housing. In some embodiments, the lock may be a bayonet lock.

In various embodiments, the connector may have a single housing. That is, the housing coupled to the ferrule assembly may be the only housing of said connector. The housing may include a front portion and a rear portion, and the front portion may be configured to receive the ferrule assembly. The lock may be coupled to the rear portion of the housing. In some embodiments, the housing may include a cylindrical portion. The cylindrical portion may be the rear portion of the housing. The bayonet lock may be disposed about the cylindrical portion. In some embodiments, the lock may include at least one flexing tab configured to snap into a respective groove of the housing so as to couple the lock to the housing. The housing may include a stop configured to limit rotation of the lock.

In some embodiments, the connector may further comprise a ferrule spring disposed within the housing. The housing may include at least one catch and the ferrule assembly may be secured to the housing between the ferrule spring and the at least one catch. The housing may comprise a plurality of inclined surfaces configured to facilitate coupling of the ferrule assembly to the housing. In some embodiments, the housing may include a plurality of slits configured to allow flexing of the housing.

In various embodiments, the housing may include at least one recess configured to receive a respective catch of an adapter. The lock may include at least one tab configured to cover the respective catch of said adapter disposed in the at least one recess of the housing when the lock is in a locked position. The at least one tab may be configured to uncover the respective catch of said adapter disposed in the at least one recess of the housing when the lock is in an unlocked position, to allow decoupling the housing from the adapter.

Various embodiments of connectors disclosed herein may have a length less than about 37 mm. Some embodiments may have a length less than or equal to about 18.5 mm. For example, one embodiment of a connector may have a length of about 18.5 mm. In various embodiments wherein the housing is coupled to an adapter, a portion of the connector protruding from said adapter may have a length less than about 26 mm. In some embodiments, the housing may be coupled to an adapter, and a portion of the connector protruding from said adapter may have a length less than or equal to about 7.5 mm. For example, the length of the portion of the connector protruding from an adapter coupled thereto may be about 7.5 mm.

According to another aspect, there is disclosed a connector comprising a housing configured to receive a ferrule assembly, and to couple to an adapter corresponding to said ferrule assembly, and a lock coupled to the housing and configured to rotate around the housing so as to lock and unlock the housing from said adapter. The housing may be configured to receive an MT/MPO ferrule assembly or an MPO ferrule assembly, and to couple to an MPO adapter. The lock may be a bayonet lock. In some embodiments, the length of the connector may be less than or equal to about 18.5 mm. Various features described in conjunction with other embodiments may further be included in this embodiment.

According to another aspect, there is disclosed a connector comprising a ferrule assembly, a housing coupled to the ferrule assembly and configured to couple to an adapter corresponding to the ferrule assembly, a lock coupled to the housing and configured to rotate so as to lock and unlock the housing from said adapter, and an interface member coupled to the housing and having a stop configured to limit rotation of the lock. The ferrule assembly may be one of an MT/MPO ferrule assembly and an MPO ferrule assembly. The lock may be a ring configured to rotate about the housing. For example, the lock may be a bayonet lock.

In various embodiments comprising the interface member, the housing may be the only housing of said connector. The housing may include a rear portion and the bayonet lock may be disposed about the rear portion. In some embodiments, the lock may include at least one flexing tab configured to snap into a respective groove of the housing so as to couple the lock to the housing. The housing may include a front portion and a rear portion, the rear portion being configured to receive the ferrule assembly. The lock may also be coupled to the rear portion of the housing.

Some embodiments comprising the interface member may further comprise a ferrule spring disposed within the housing. The ferrule assembly may include a raised flange and the housing may include a corresponding ferrule flange stop, the ferrule assembly being secured to the housing between the ferrule spring and the ferrule flange stop. The housing may further comprise a plurality of inclined surfaces configured to facilitate coupling of the ferrule assembly to the housing. The housing may include at least one recess configured to receive a respective catch of the adapter. The lock may include at least one tab configured to cover the respective catch of said adapter disposed in at least one recess of the housing when the lock is in a locked position. At least one tab may be configured to uncover the respective catch of the adapter disposed in a recess of the housing when the lock is in an unlocked position, to allow decoupling the housing from the adapter.

Various embodiments may have a length less than about 32 mm. For example, the length may be less than or equal to about 18.5 mm. In some embodiments, the interface member may include a reinforcement portion configured to reinforce an optical fiber cable received by the interface member. These embodiments may have a length less than or equal to about 23.5 mm.

BRIEF DESCRIPTION OF THE FIGURES

FIG. 9 is a perspective view showing the prior art MPO connector of FIG. 2 being inserted into the prior art adapter of FIG. 6;
FIG. 10 is a side view of the prior art MPO connector of FIG. 2 coupled to the prior art adapter of FIG. 6;
FIGS. 11A and 11B are cross-sectional views of the prior art MPO connector and adapter of FIG. 10 just before latching;
FIG. 21 is a side view of the housing of FIG. 16, showing a slit to allow flexing according to aspects of the present disclosure;
FIG. 22 is a top view of the housing of FIG. 21, showing a groove and a plurality of stops according to aspects of the present disclosure;
FIG. 27 is a perspective view of a locked connector coupled to an adapter positioned near a circuit board according to aspects of the present disclosure;

FIGS. 36A and 36B are various cross-sectional views of the embodiment shown in FIG. 35 prior to complete assembly according to aspects of the present disclosure.

DETAILED DESCRIPTION

As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals. A multi-fiber optic cable includes a plurality of the optical fibers. For connection of cables together or with other fiber optic devices, the terminal ends of a cable may include a connector. A connector may include a housing structure configured to interact with and connect with an adapter.

An MPO connector is a multi-fiber connector defined by industry standards. One brand of an MPO connector is an MPT connector. A conventional MPO connector has many constituent parts and a push/pull locking and unlocking mechanism, resulting in a relatively long connector, increased cost of materials and labor, as well as the complexity of assembly.

Figure 1:
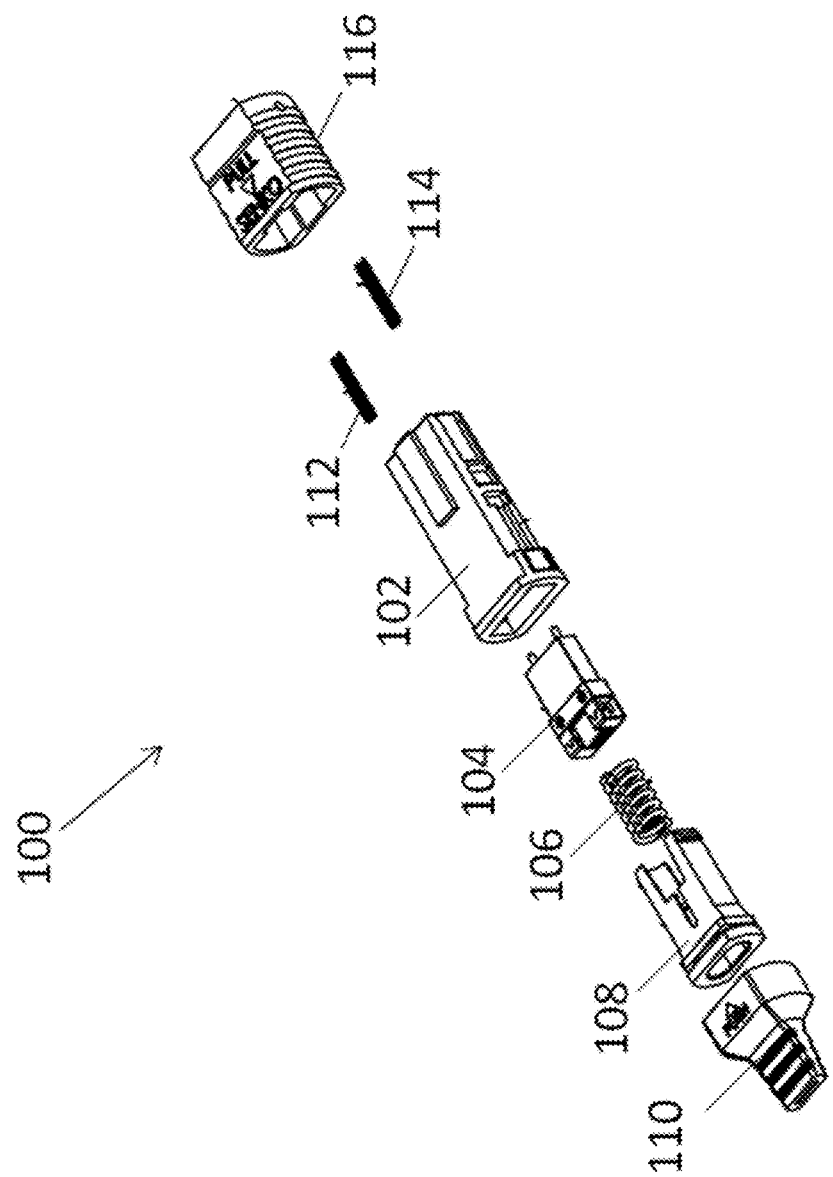
FIG. 1 is an exploded view of a prior art MPO connector.

FIG. 1 shows an exploded view of a prior art MPO connector 100. The connector 100 is an assembly having eight parts. The connector 100 includes a main body or inner housing 102, a ferrule assembly 104, a ferrule spring 106, a spring retainer/pusher 108, a strain relief, two outer housing springs 112 and 114, and a sliding outer housing 116. Conventional MPO connectors use multiple housing components, such as the inner housing and the outer housing of the connector 100.

Figure 2:
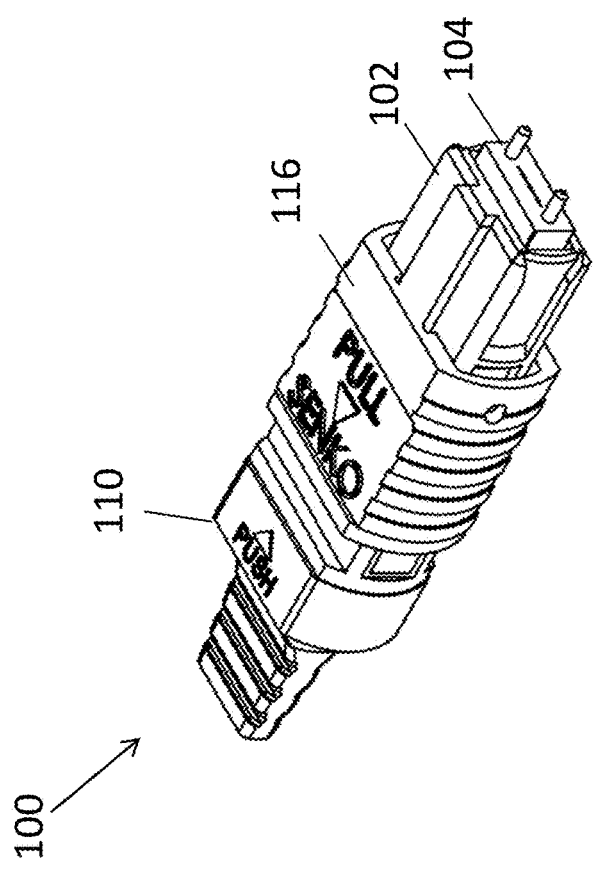
FIG. 2 is a perspective view of the assembled prior art MPO connector of FIG. 1.
Figure 3:
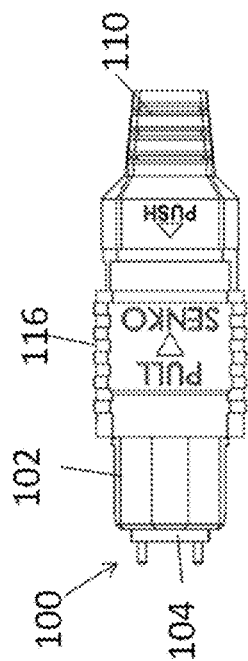
FIG. 3 is a top view of the prior art MPO connector of FIG. 2.
Figure 4:
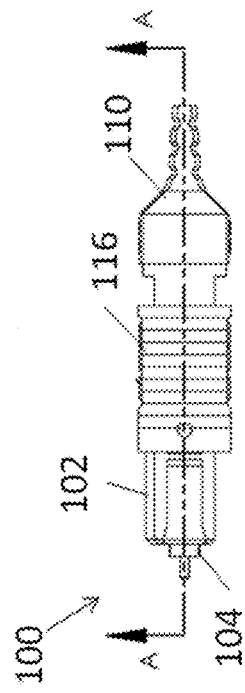
FIG. 4 is a side view of the prior art MPO connector of FIG. 2.

A perspective view of the assembled prior art MPO connector of FIG. 1 is shown in FIG. 2. The ferrule assembly 104 disposed within the inner housing 102, which is further disposed within the outer housing 116, and coupled to the strain relief 110. In the assembled form shown in FIG. 2, the connector 100 has an overall length of about 37 mm. FIG. 3 is a top view of the prior art MPO connector 100 of FIG. 2. FIG. 4 is a side view of the prior art MPO connector 100 of FIG. 2.

Figure 5:
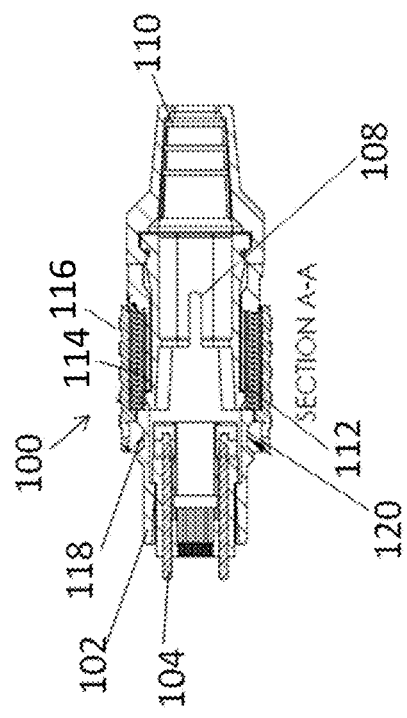
FIG. 5 is a cross-sectional view of the prior art MPO connector of FIG. 2.

FIG. 5 shows a cross-sectional view of the prior art MPO connector 100, along section A-A shown in FIG. 4. FIG. 5 further shows the outer springs 112 and 114, configured to allow sliding of the outer housing 116. The inner housing 102 includes recesses 118 and 120 for engaging with the catches of an adapter.

Figure 6:
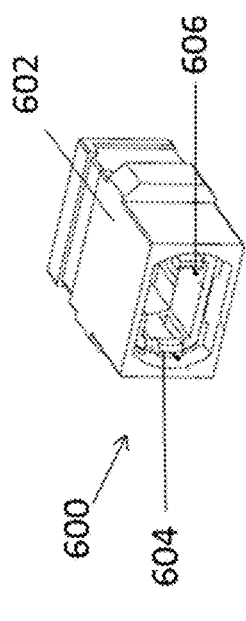
FIG. 6 is a perspective view of a prior art MPO adapter that is compatible with various embodiments of connectors according to aspects of the present disclosure.
Figure 7:
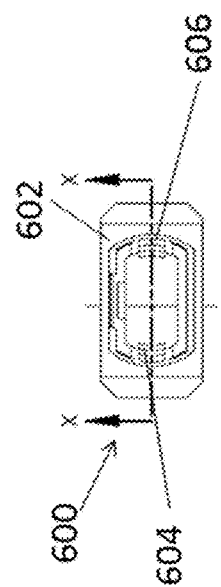
FIG. 7 is a front view of the prior art MPO adapter of FIG. 6.
Figure 8:
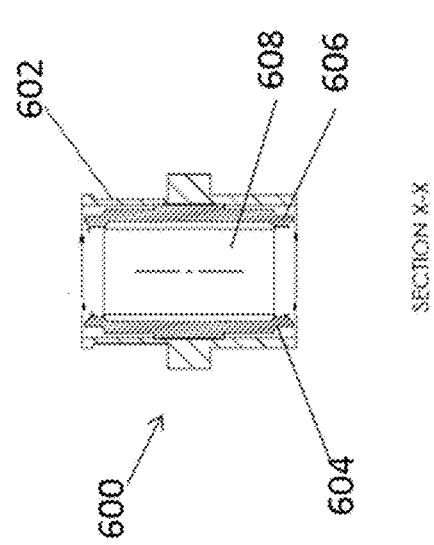
FIG. 8 is a cross-sectional view of the prior art MPO adapter of FIG. 6.

A perspective view of a prior art MPO adapter 600 is shown in FIG. 6. The adapter includes an adapter housing 602, and adapter catches 604 and 606. FIG. 7 is a front view of the prior art MPO adapter of FIG. 6, showing the catches 604 and 606. FIG. 8 is a cross-sectional view of the prior art MPO adapter 600 along section X-X of FIG. 7, showing the catches 604 and 606, and a channel 608 configured to receive at least a portion of a ferrule assembly within the housing 602.

The prior art MPO connector 100 may be inserted into the adapter 600 by pushing the strain relief 110, as shown in FIG. 9. Conventional MPO connectors, such as the connector 100, use both the strain relief and the sliding outer housing for latching to and unlatching from the adapter 600. Specifically, the MPO connector 100 is pushed using the strain relief 110 to latch the connector into the adapter and the outer housing 116 is pulled or retracted to unlatch the connector from the adapter. These components, as well as the many constituent parts of the MPO adapter as shown in FIG. 1 are necessary for locking and unlocking the MPO connector and the adapter. Moreover, the design of a conventional MPO connector dictates that these components be arranged adjacent to one another, thereby resulting in a relatively long length of the conventional MPO connector. For example, the length of the connector 100 is about 37 mm.

Figure 11B:
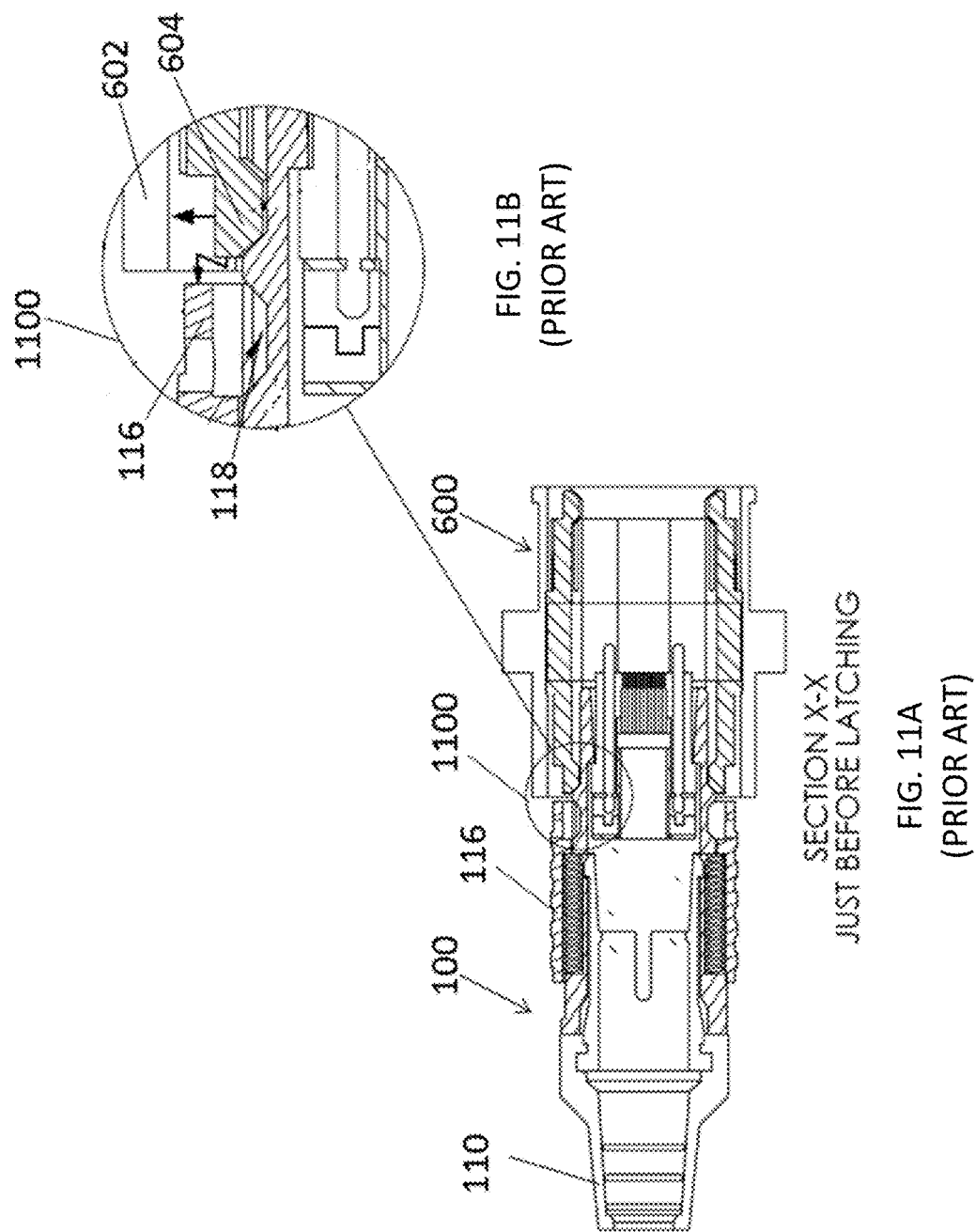

A side view of the prior art MPO connector 100 coupled to the adapter 600 is shown in FIG. 10. FIGS. 11A and 11B show cross-sectional views of the MPO connector 100 and the adapter 600 along Section X-X shown in FIG. 10, just prior to latching. FIG. 11B shows a zoomed portion enclosed within the circle 1100 of FIG. 11A. Specifically, FIG. 11B shows an MPO adapter catch 604 within the housing 602 of the MPO adapter 600, and a recess 118 of the connector 100 just prior to latching. As the MPO connector 100 travels into the MPO adapter 600, the catches of the adapter, including catch 604, flex outward. With the catches opened, the catches push back the outer sliding housing 116 which is spring loaded, and engage the recesses, including recess 118, of the MPO connector 100.

Figures 12A, 12B:
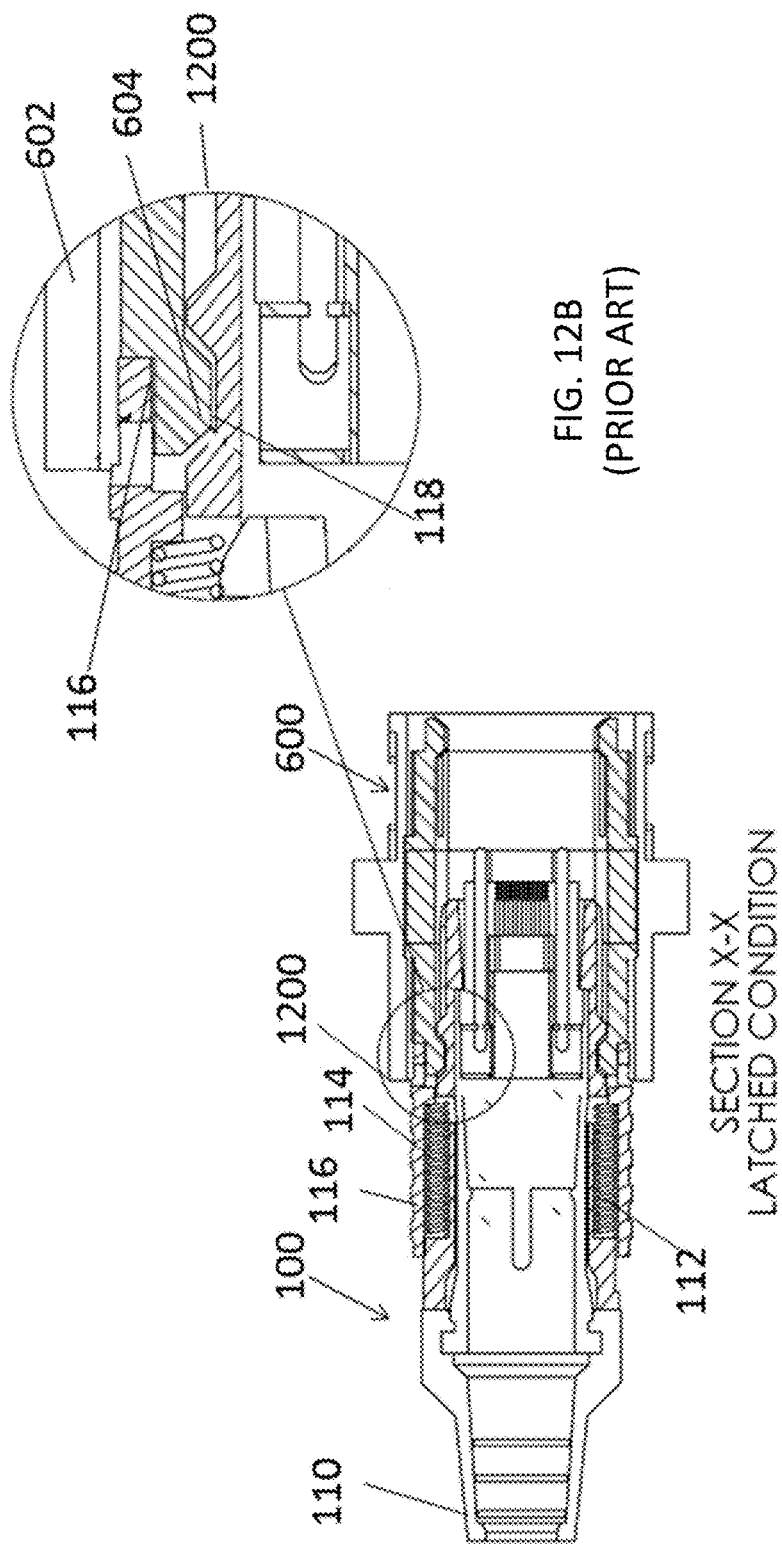
FIGS. 12A and 12B are cross-sectional views of the coupled prior art MPO connector and adapter of FIG. 11A in a latched position.

FIGS. 12A and 12B show cross-sectional views of the MPO connector 100 and the adapter 600 along Section X-X shown in FIG. 10, after latching. FIG. 12B shows a zoomed portion enclosed within the circle 1200 of FIG. 12A. Specifically, FIG. 12B shows that the MPO adapter catch 604 within the housing 602 of the MPO adapter 600 has engaged the recess 118 of the connector 100. The sliding outer housing 116 has been pushed forward by the springs 112 and 114 as shown in FIG. 12A.

Figure 13:
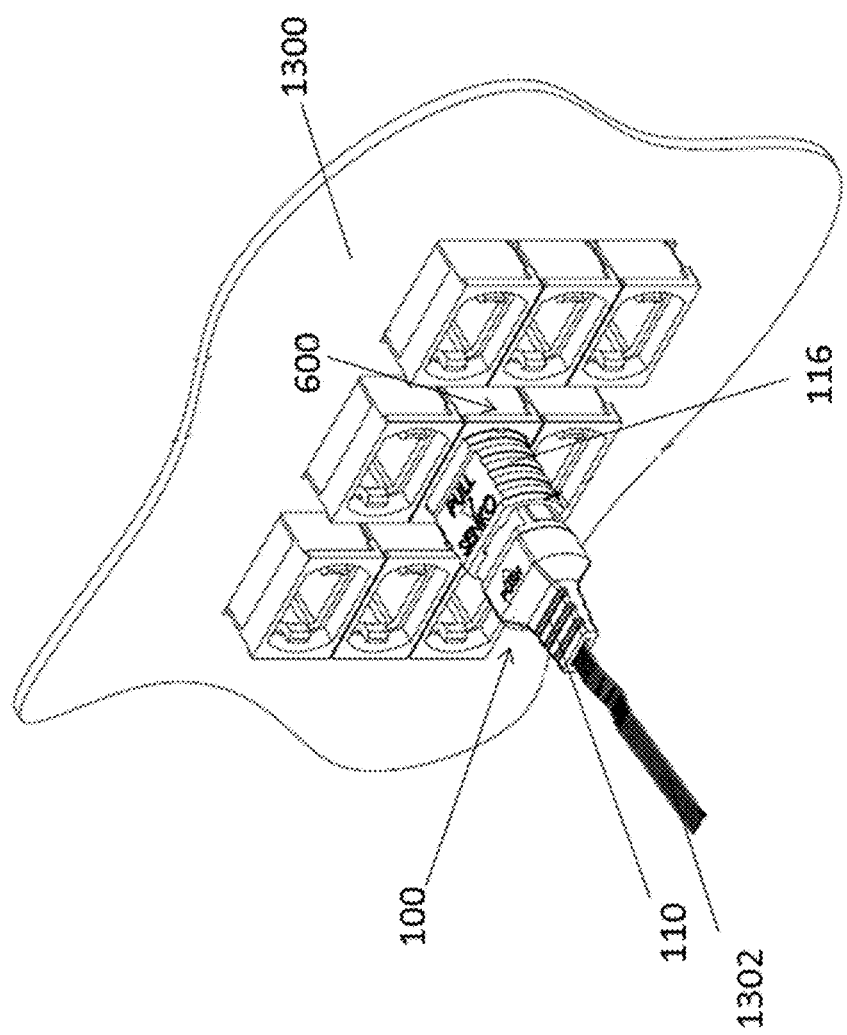
FIG. 13 is a perspective view of the prior art MPO connector of FIG. 2 coupled to an adapter disposed on a panel of adapters.
Figure 14:
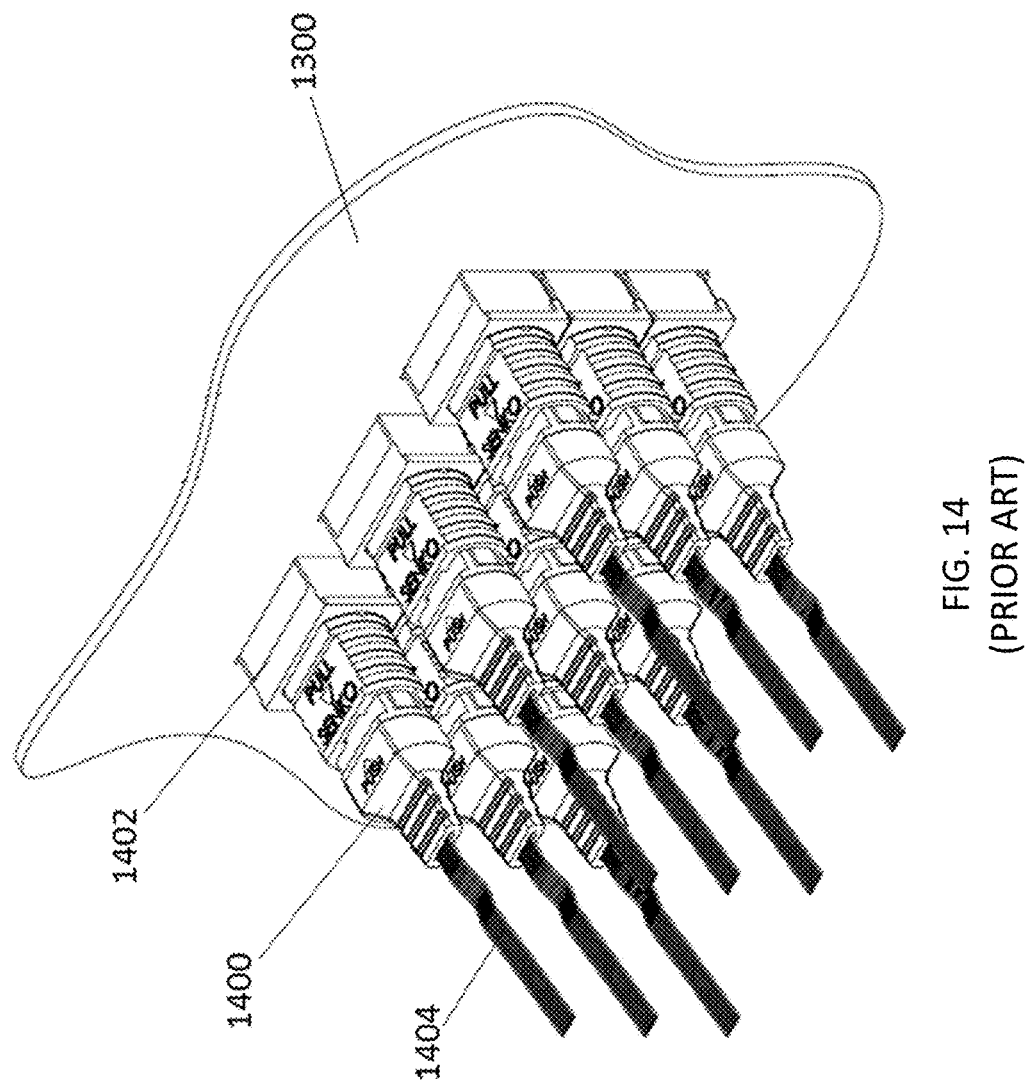
FIG. 14 is a perspective view of a plurality of prior art MPO connectors coupled to adapters on a high density panel, creating access issues.

Connectors may need to couple to adapters placed in high density panels. For example, FIG. 13 shows the MPO connector 100 coupled to the adapter 600 disposed in a panel 1300 having a plurality of MPO adapters. The connector 100 has a multi-fiber ribbon 1302. The MPO adapter 100 is inserted into the adapter 600 by pushing in while holding the strain relief 110 by hand. The MPO connector 100 is removed from the panel adapter 600 by pulling back the sliding outer housing 116 by hand. FIG. 14 shows additional conventional MPO connectors 1400 coupled to adapters 1402 on the high density panel 1300, creating problems for access to any MPO connector located in the middle of the MPO adapter field. Reaching into the middle of the field of adapters to remove an MPO connector is impossible to accomplish by hand without damage or disruption to adjacent MPO connectors and delicate ribbon fibers 1404.

Aspects of the present disclosure are directed to addressing the shortcomings of the conventional MPO connectors described in relation with FIGS. 1 to 14. Various embodiments disclosed herein provide connectors that are shorter than the conventional connectors and have less components, thereby being both cost efficient and capable of use in tight spaces. Moreover, various embodiments may be compatible with existing adapters, such as the MPO adapters described in relation with FIGS. 6 to 8.

Figure 15:
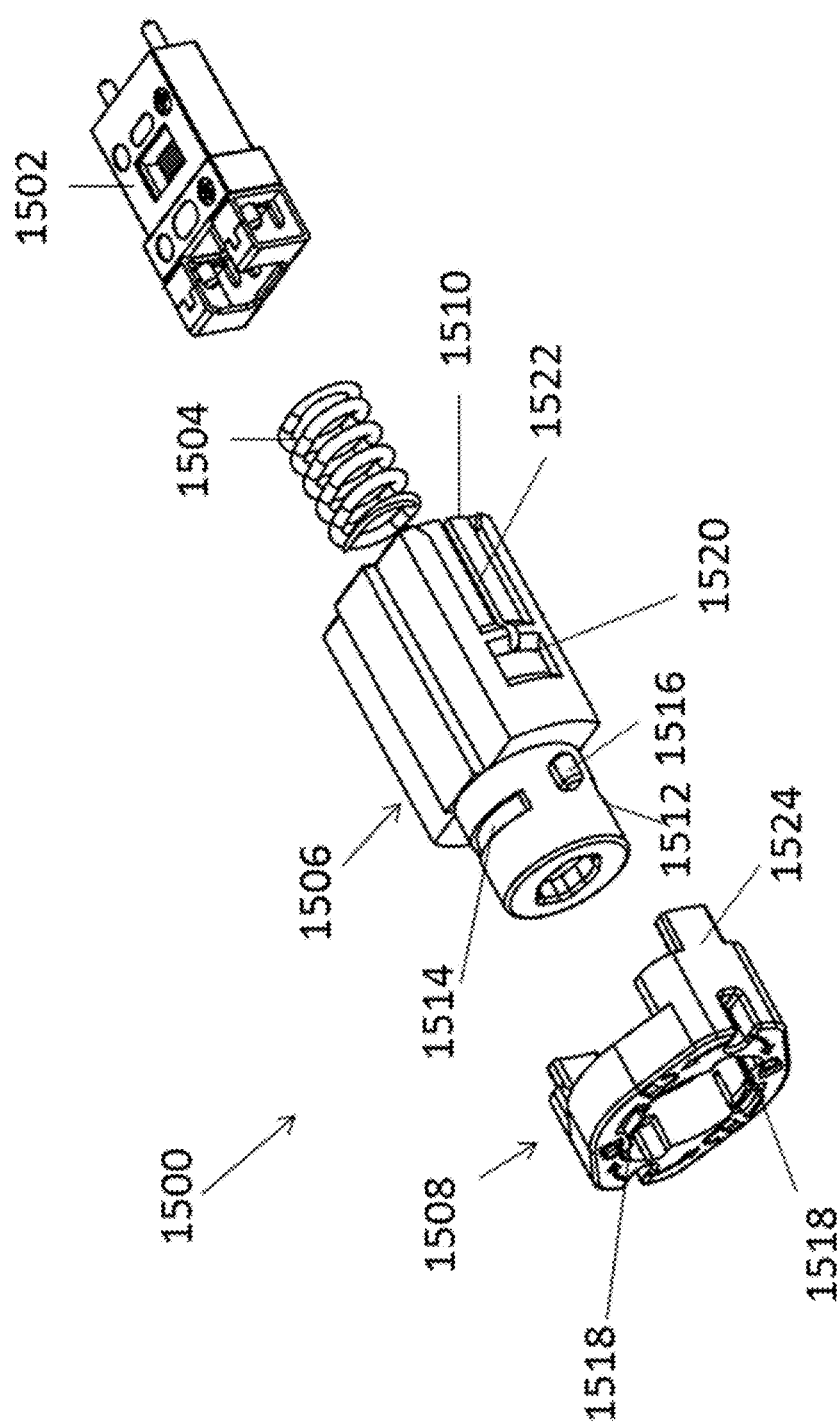
FIG. 15 is an exploded view of one embodiment of a connector according to aspects of the present disclosure.

FIG. 15 shows one embodiment of a connector 1500 according to aspects of the present disclosure. The connector 1500 includes an MPO ferrule assembly 1502, a ferrule spring 1504, a main body or housing 1506 and a lock 1508. Connectors disclosed herein may include less components compared to conventional MPO connectors. For example, the connector 1500 includes four components, less than the eight components of known MPO connectors as shown in FIG. 1. In various embodiments, a connector may include an MPO connector or an MT/MPO connector. For example, the ferrule may be an MT ferrule, whereas the ferrule assembly may be an MPO ferrule assembly. Although the ferrule assembly 1502 shown in FIG. 15 is a male ferrule assembly, various embodiments disclosed herein may include a female ferrule assembly.

In one embodiment, the housing may include a front portion and a rear portion. The rear portion may be cylindrically shaped. For example, as shown in FIG. 15, the housing 1506 includes a front portion 1510 and a cylindrical rear portion 1512. The housing 1506 may be configured to receive the ferrule assembly 1502 from the front portion 1510 of the housing. This is in contrast with the conventional MPO connectors, where the ferrule is received from the rear portion of the inner housing. For example, in FIG. 1, the inner housing 102 is configured to receive the ferrule assembly 104 from the rear portion of the inner housing. An advantage of receiving the ferrule assembly through the front of the housing is that it allows the rear portion of the housing to accommodate a single locking and unlocking mechanism for the connector. Another advantage is the use of less components in the connector.

The housing 1506 is configured to receive both the ferrule spring 1504 and the ferrule assembly 1502 through the front portion 1510. The ferrule spring 1504 and the ferrule assembly may be common parts used in conventional MPO connectors. In other embodiments, the ferrule assembly or the ferrule spring may be new or different types than those used in conventional connectors.

Moreover, in one embodiment, as shown in FIG. 15, the cylindrical portion 1512 of the housing 1506 may be configured to couple to the lock 1508. The lock may be configured to rotate about the housing so as to lock and unlock the housing from an adapter corresponding to the ferrule assembly 1502. In this embodiment, the lock 1508 is a bayonet lock. In other embodiments, the lock may be of another type. In one embodiment, the lock may be a ring coupled to the housing by any other coupling means and configured to rotate about the housing so as to lock and unlock the housing from an adapter.

As shown in FIG. 15, the bayonet lock 1508 may be configured to couple to the cylindrical portion of the housing 1506. The housing 1506, and specifically the cylindrical portion 1512 in this embodiment, may have at least one groove 1514 and at least one stop 1516. Further, the lock 1508 may include at least one flexing tab 1518 configured to snap into the groove 1514 so as to couple the lock to the housing 1506. The stop 1516 may be disposed on the housing 1506 so as to limit rotation of the lock 1508.

Various coupling mechanisms may be provided for coupling the connector to an adapter. For example, in one embodiment as shown in FIG. 15, the housing 1506 may have at least one recess 1520 configured to receive a respective catch of an adapter so as to couple the connector 1500 to the adapter. Moreover, the housing 1506 may have at least one slit 1522 to allow flexing of the housing. In some embodiments, as shown, the lock 1508 may also have at least one tab 1524 positioned so as to allow covering a respective recess 1520 of the housing, as well as a respective adapter catch, when the lock 1508 is in a locked position.

Figures 16, 17:
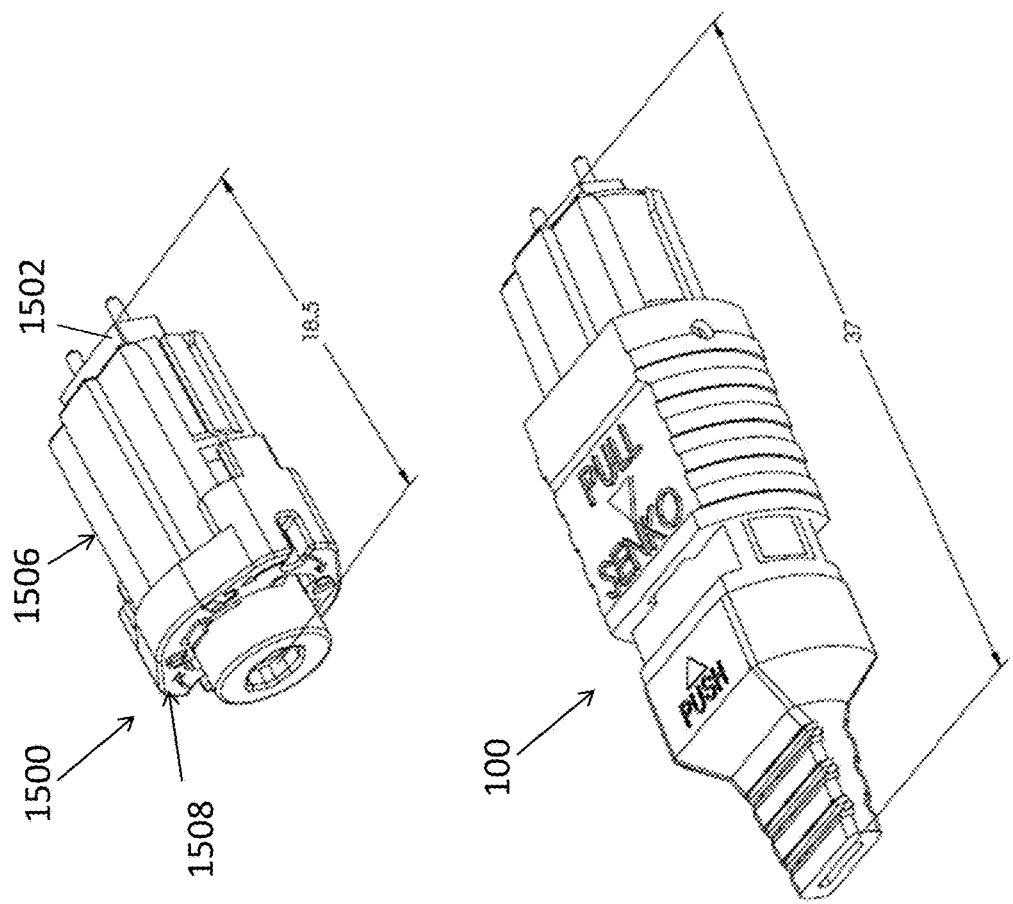
FIG. 16 is a perspective view showing an assembled form of the embodiment of the connector of FIG. 15, having a length of 18.5 mm according to aspects of the present disclosure.
FIG. 17 is a perspective view of the prior art MPO connector of FIG. 2, having a length of 37 mm in comparison with the embodiment of FIG. 16 which has a length of 18.5 mm.

An assembled form of the connector 1500 is shown in FIG. 16. The length of the assembled MPO connector 1500 is about 18.5 mm. By contrast, as shown in FIG. 17, the prior art MPO connector 100 has a length of about 37 mm. Embodiments disclosed herein allow shorter length MPO connectors, for example, by using a single housing and a rotating mechanism that requires twisting to latch and unlatch. By contrast, conventional MPO connectors use multiple housing components and a sliding mechanism to latch and unlatch.

Figure 18:
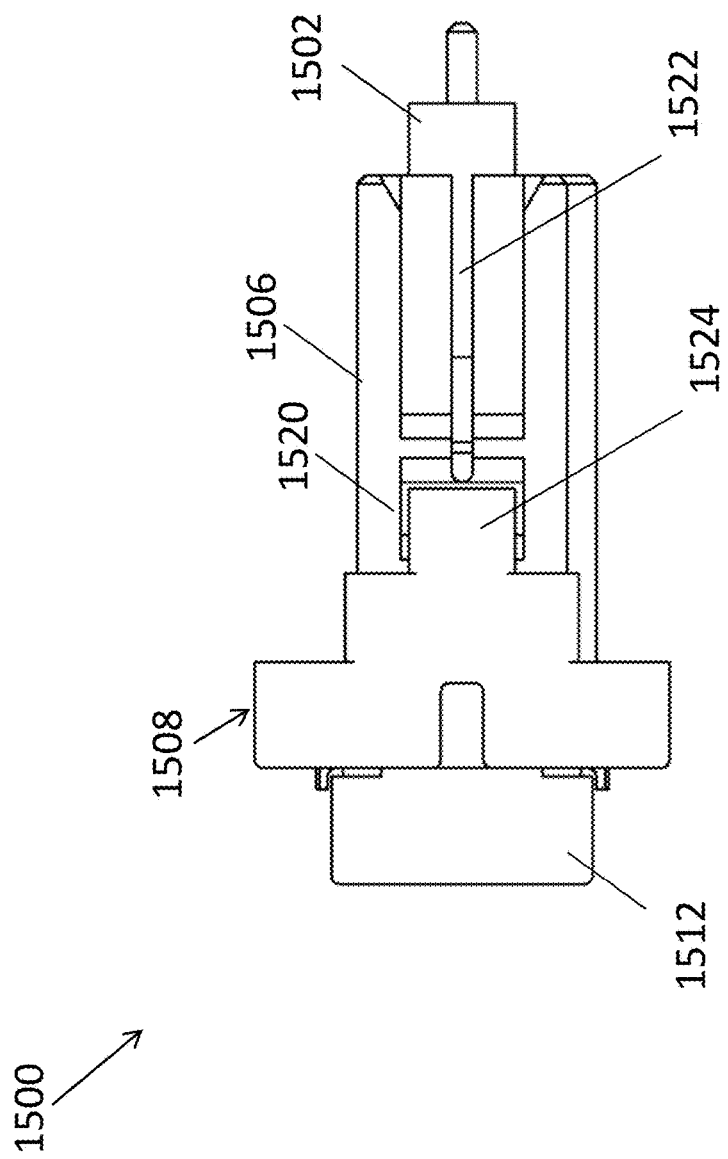
FIG. 18 is a side view of the connector of FIG. 16 according to aspects of the present disclosure.

FIG. 18 is a side view of the connector 1500, showing the housing 1506 having a slit 1522 and a recess 1520 covered by the tab 1524 of the lock 1508 disposed around the rear cylindrical portion 1512. The ferrule assembly 1502 is coupled to the housing 1506.

Figure 19:
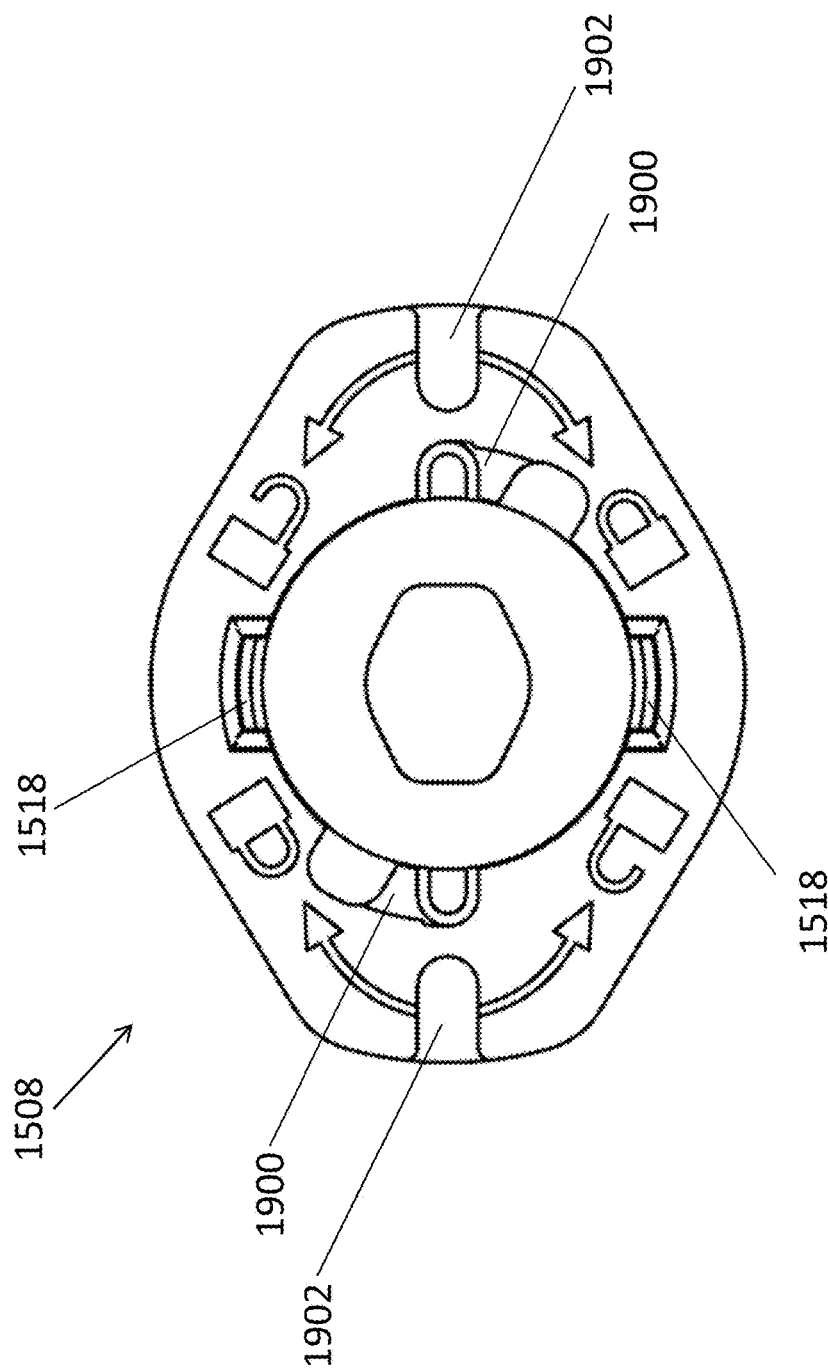
FIG. 19 is a front view of a bayonet lock according to aspects of the present disclosure.

In some embodiments of connectors disclosed herein, bayonet type locks may be provided. FIG. 19 is a front view of the bayonet lock 1508, showing two flexing tabs 1518 configured to snap into respective grooves of the housing. In some embodiments, the lock 1508 may have recesses 1900 configured to limit rotation of the lock in conjunction with stops disposed on the housing, such as the stop 1516 shown in FIG. 15. In some embodiments, the lock 1508 may also have recesses 1902 configured to receive a tool to facilitate rotation of the lock, especially when the connector is coupled to an adapter in a high density adapter panel. The arrows on the lock 1508 indicate lock and unlock directions.

Figure 20:
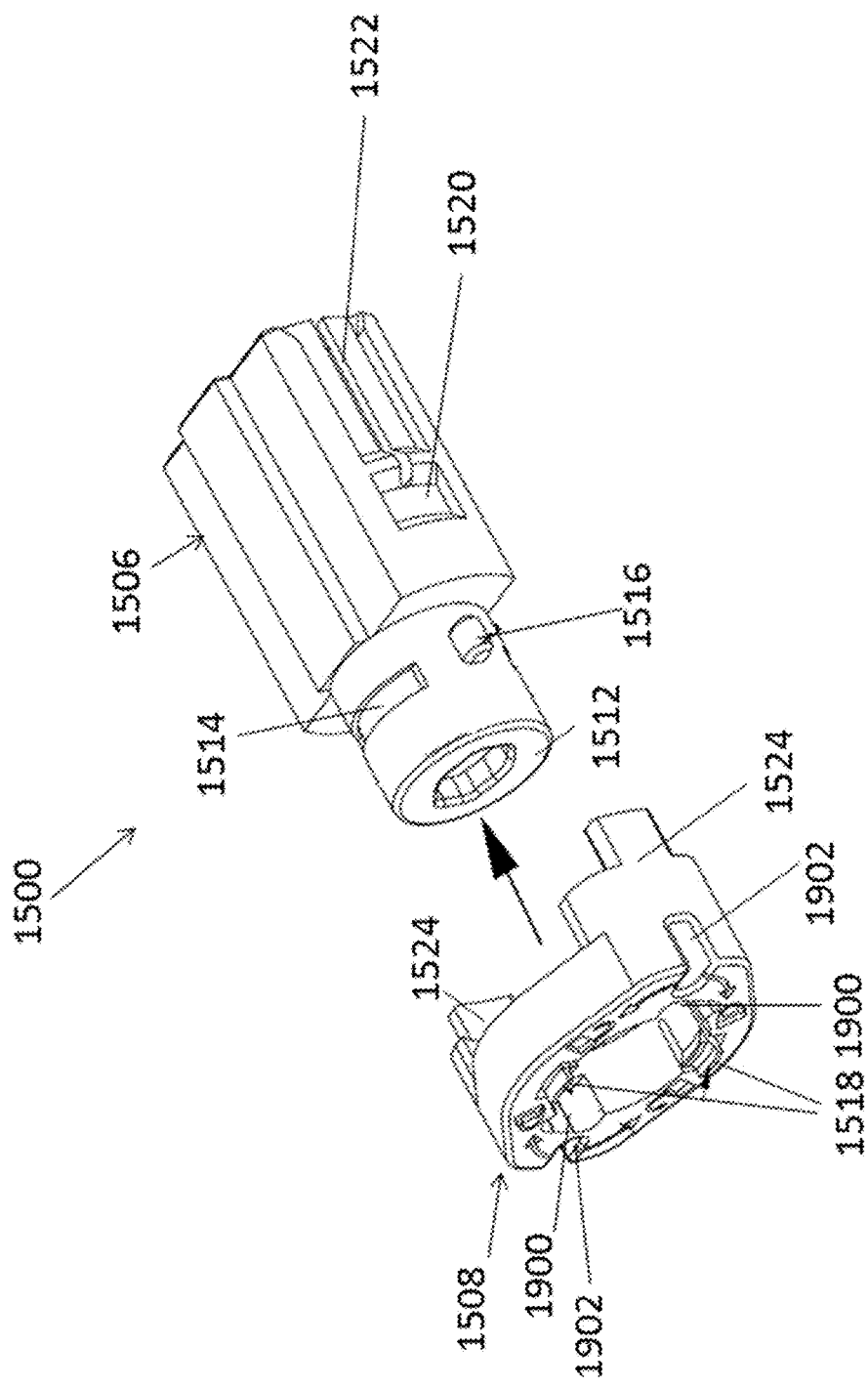
FIG. 20 is an exploded view of the connector of FIG. 16, showing the housing and lock according to aspects of the present disclosure.

FIG. 20 shows an exploded view of the connector 1500 including the housing 1506 and the bayonet lock 1508. The arrow indicates the direction of assembly of the lock with the housing. The housing 1506 may include slits 1522 and recesses 1520 on either side of the housing. The housing 1506 may also have stops 1516 on either side of the housing, and grooves 1514 at the top and bottom of the housing, disposed around the cylindrical portion 1512 so as to couple the lock 1508 to the housing. The stops 1516 are bumps on each side of the housing 1506, and configured to fit into recesses 1900 inside the bayonet lock 1508 to limit rotation and provide stops at the locked and unlocked positions of the bayonet lock.

As shown in FIG. 20, in some embodiments, the lock 1508 may have two flexing tabs 1518 arranged in positions corresponding to that of the two grooves 1514 of the housing 1506, and configured to engage the grooves to couple the lock to the housing. The lock 1508 may also have recesses 1900 configured to engage the stops 1516 to limit rotation of the lock. Moreover, the lock 1508 may have recesses 1902 configured to receive a portion of a tool to rotate the lock. Finally, the lock 1508 may have two tabs 1524 on either side of the lock, positioned to correspond to the locations of the recesses 1520 of the housing 1506 to allow covering the recesses and respective catches of an adapter coupled to the connector 1500. In other embodiments, the lock may be configured to include a different number or arrangement of flexing tabs, recesses for stops, recesses for a locking and unlocking tool, and tabs to facilitate coupling and decoupling the connector to and from an adapter.

FIG. 21 is a side view of the housing 1506, showing the slit 1522, the recess 1520, the stop 1516 and the two grooves 1514. In this embodiment, the housing is symmetrical, such that the other side of the housing is identical to the side shown in FIG. 21. However, in other embodiments, the housing need not be symmetrical, and various features discloses herein may be arranged in different configurations. FIG. 22 shows a top view of the housing 1506, showing the top groove 1514 and a two stops 1516 on the sides of the housing, specifically positioned on the cylindrical portion 1512 that is configured to couple with a lock.

Figure 24:
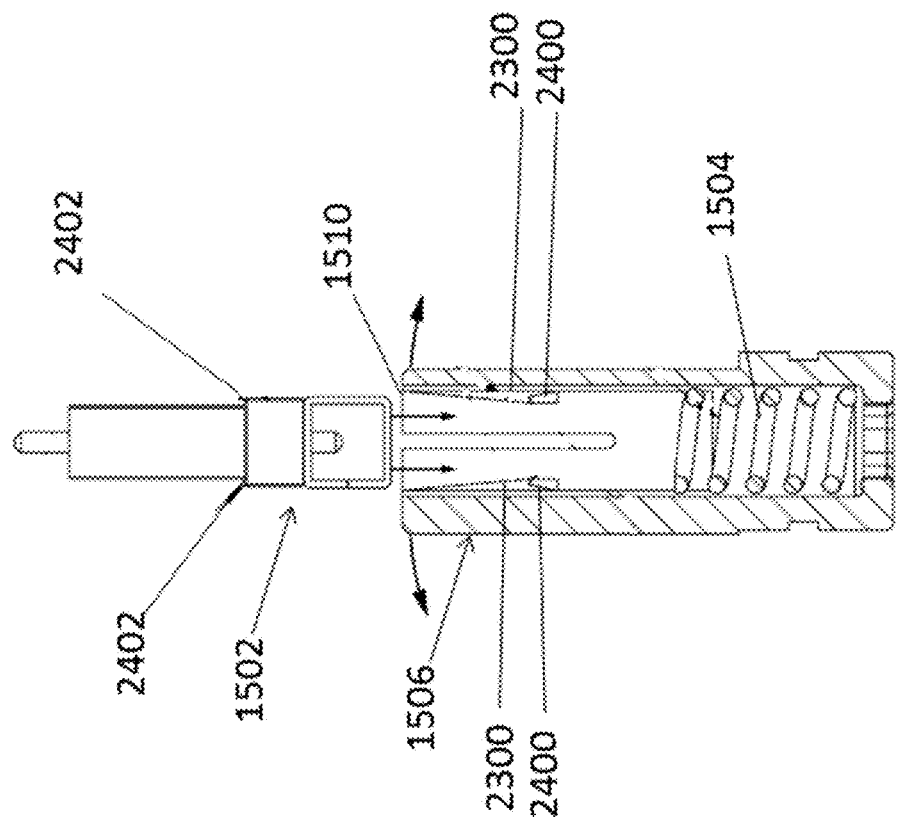
FIG. 24 is a cross-sectional view of the housing of FIG. 21 being coupled to a ferrule assembly, showing a ferrule spring and a plurality of inclined surfaces of the housing according to aspects of the present disclosure.
Figure 23:
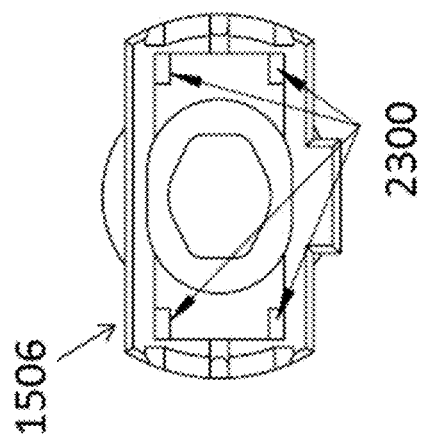
FIG. 23 is a front view of the housing of FIG. 21 according to aspects of the present disclosure.

FIGS. 23 and 24 illustrate one embodiment of the interior of the housing 1506. FIG. 23 shows a front view through the housing 1506, illustrating one embodiment wherein the housing includes inclined surfaces 2300 within the housing. FIG. 24 also shows the inclined surfaces 2300 configured to facilitate coupling of the ferrule assembly 1502 to the housing 1506. The cross-sectional view of the housing in FIG. 24 also shows that the housing may accommodate the ferrule spring 1504 disposed within the housing, and may also include a plurality of catches 2400 configured to engage the ferrule assembly 1502. The ferrule assembly 1502 may be inserted into the housing 1506 through a front portion 1510 of the housing. The ferrule assembly 1502 may include a plurality of corners 2402 which engage the catches 2400. Thus, the ferrule assembly 1502 may be secured to the housing 1506 between the ferrule spring 1504 and the catches 2400.

Figure 25B:
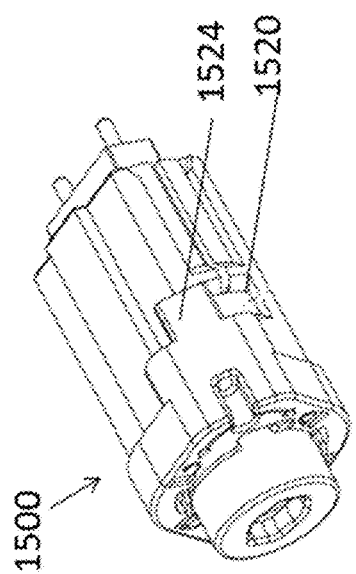
FIG. 25B is a perspective view of the connector of FIG. 16 in an unlocked position, showing a recess in the housing being uncovered by a tab of the lock in the unlocked position according to aspects of the present disclosure.
Figure 26B:
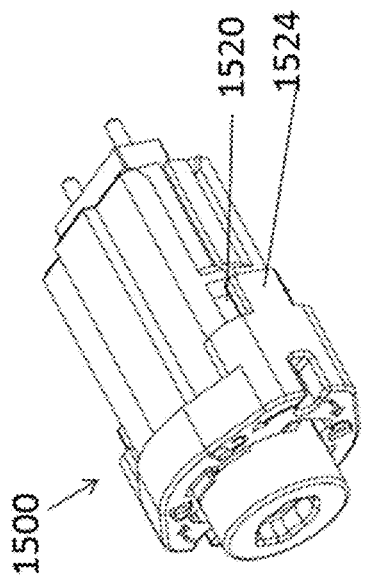
FIG. 26B is a perspective view of the connector of FIG. 25B in a locked position, showing a recess in the housing being covered by a tab of the lock in the locked position according to aspects of the present disclosure.
Figure 25A:
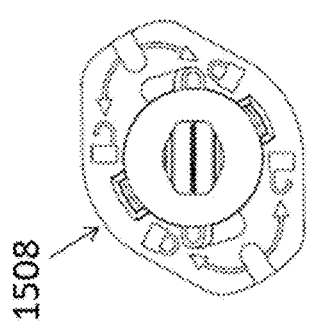
FIG. 25A is a front view of a lock in an unlocked position according to aspects of the present disclosure.
Figure 26A:
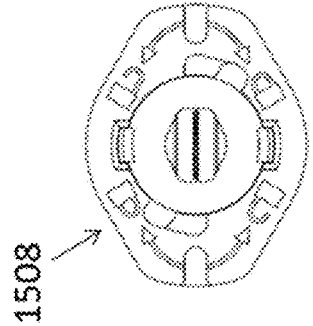
FIG. 26A is a front view of the lock of FIG. 25A in a locked position according to aspects of the present disclosure.

The bayonet lock 1508 is shown in an unlocked position in FIG. 25A, and in a locked position in FIG. 26A. During operation of one embodiment, the connector is pushed by the bayonet lock into an adapter, following by a $\frac{1}{12}^{th}$ rotational twist to latch and lock the connector to the adapter. The reverse is done to unlatch and unlock the connector from the adapter. In some embodiments, the lock may be configured so as to make a clicking noise and/or provide another form of feedback to the user when twisting the lock. This will allow the user to more conveniently recognize the switch between locked and unlocked states of the connector. In one embodiment, when the bayonet lock 1508 is in an unlocked position, as shown in FIG. 25B, the recesses 1520 of the housing may be uncovered. On the other hand, when the bayonet lock 1508 is in a locked position, as shown in FIG. 26B, the tabs 1524 of the lock may cover the recesses 1520 of the housing, as well as the catches of the adapter coupled to the recesses.

Figure 28:
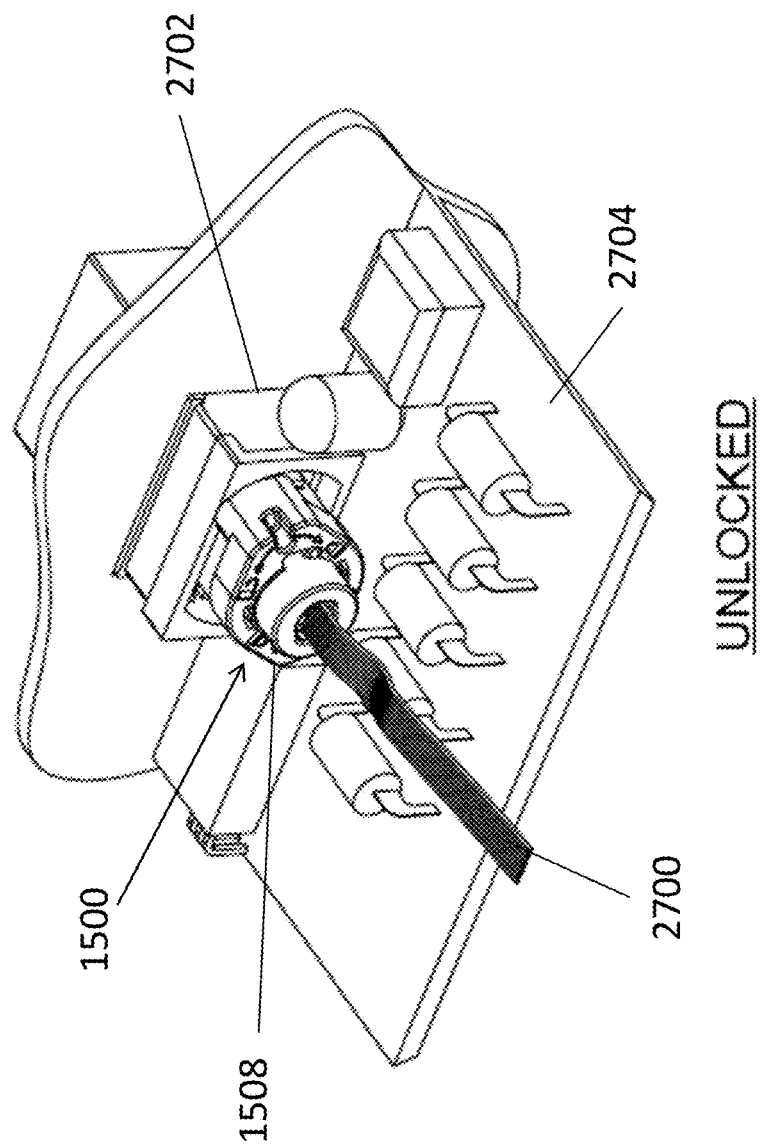
FIG. 28 is a perspective view of the connector of FIG. 27 in an unlocked position and coupled to an adapter positioned near a circuit board according to aspects of the present disclosure.

The connector 1500 may be coupled to an adapter positioned on a panel or inside a device or module, or close to a circuit board. For example, FIG. 27 shows the connector 1500 having a ribbon fiber 2700. Ribbon fibers may be delicate, requiring careful handling. For example, as shown in FIG. 27, the connector 1500 is coupled to an adapter 2702 positioned near a circuit board 2704. The compact size and shorter length of the connector 1500 requires less space inside a device or module, a benefit when positioned to circuit boards. The connector 1500 is shown to be in a locked position in FIG. 27. The same connector 1500 is shown in an unlocked position in FIG. 28. The bayonet lock 1508 is shown to be twisted relative to the locked position in FIG. 27. In one embodiment, when the connector is coupled to an adapter as shown for example in FIGS. 27 and 28, the portion of the connector protruding from the adapter may have a length less than or equal to about 7.5 mm. In other embodiments, the length of the protruding portion may be less than that of a conventional connector, e.g. less than about 26 mm.

Various embodiments of connectors disclosed herein may be configured to allow locking and unlocking using tools. FIG. 29A shows a tool 2900, such as a wrench, in an unlocked position of the connector 1500, and FIG. 29B shows the same tool moved to a locked position, thereby locking the connector to the adapter 2702.

Figure 29B:
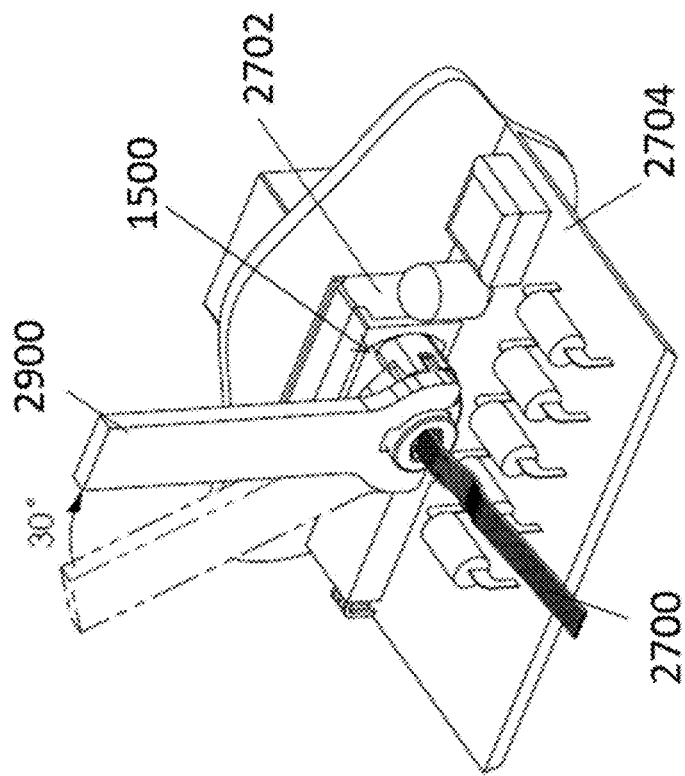
FIGS. 29A and 29B are perspective views of the connector of FIG. 27 coupled to an adapter positioned near a circuit board, showing the use of tool for locking and unlocking the connector according to aspects of the present disclosure.
Figure 29A:
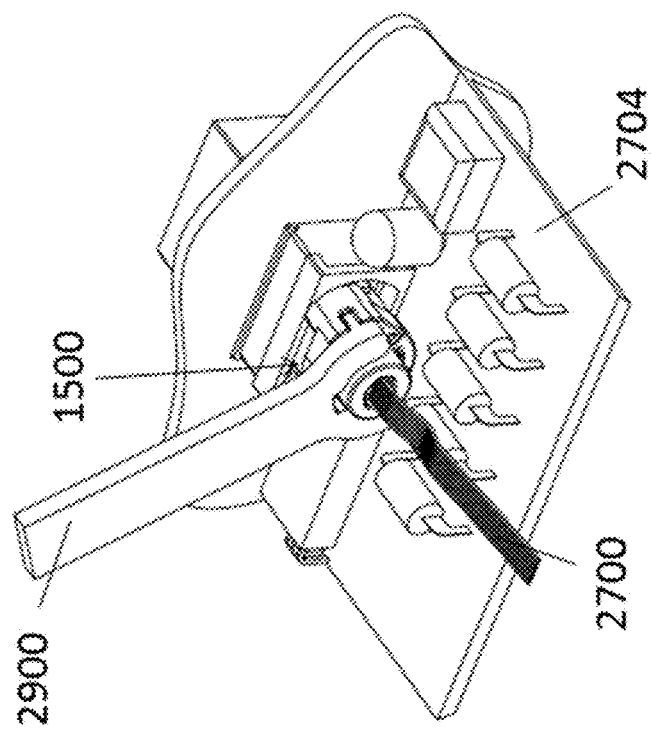
Figure 30:
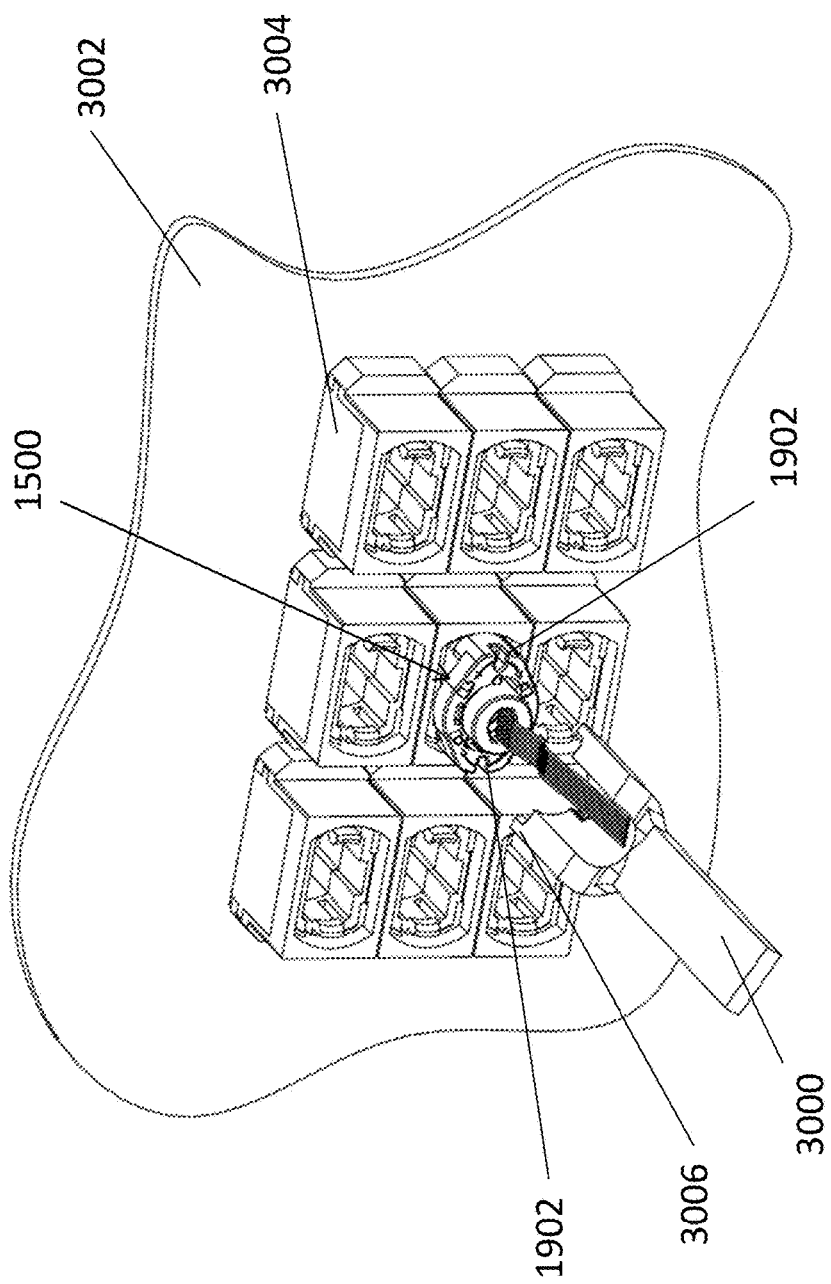
FIG. 30 is a perspective view of a connector coupled to an adapter in a high density panel, showing the use of a tool for axially locking and unlocking the connector according to aspects of the present disclosure.

In some embodiments where adapters are positioned in high density panels or delicate spaces, locking or unlocking using a tool positioned in a transverse plane of the connector, as shown in FIGS. 29A and 29B, may not be feasible. In such cases, a tool, such as tool 3000 shown in FIG. 30, positioned along the longitudinal axial direction of the connector 1500 may allow access to the high density panel 3002 having a plurality of adapters 3004 arranged in close proximity. Accordingly, the connector may be configured with recesses 1902, as shown and described for example in relation with FIG. 19. The recesses 1902 may be configured to receive respective keys 3006 of the tool 3000, thereby allowing convenient manipulation of the connector 1500, even in high density spaces.

Figure 31:
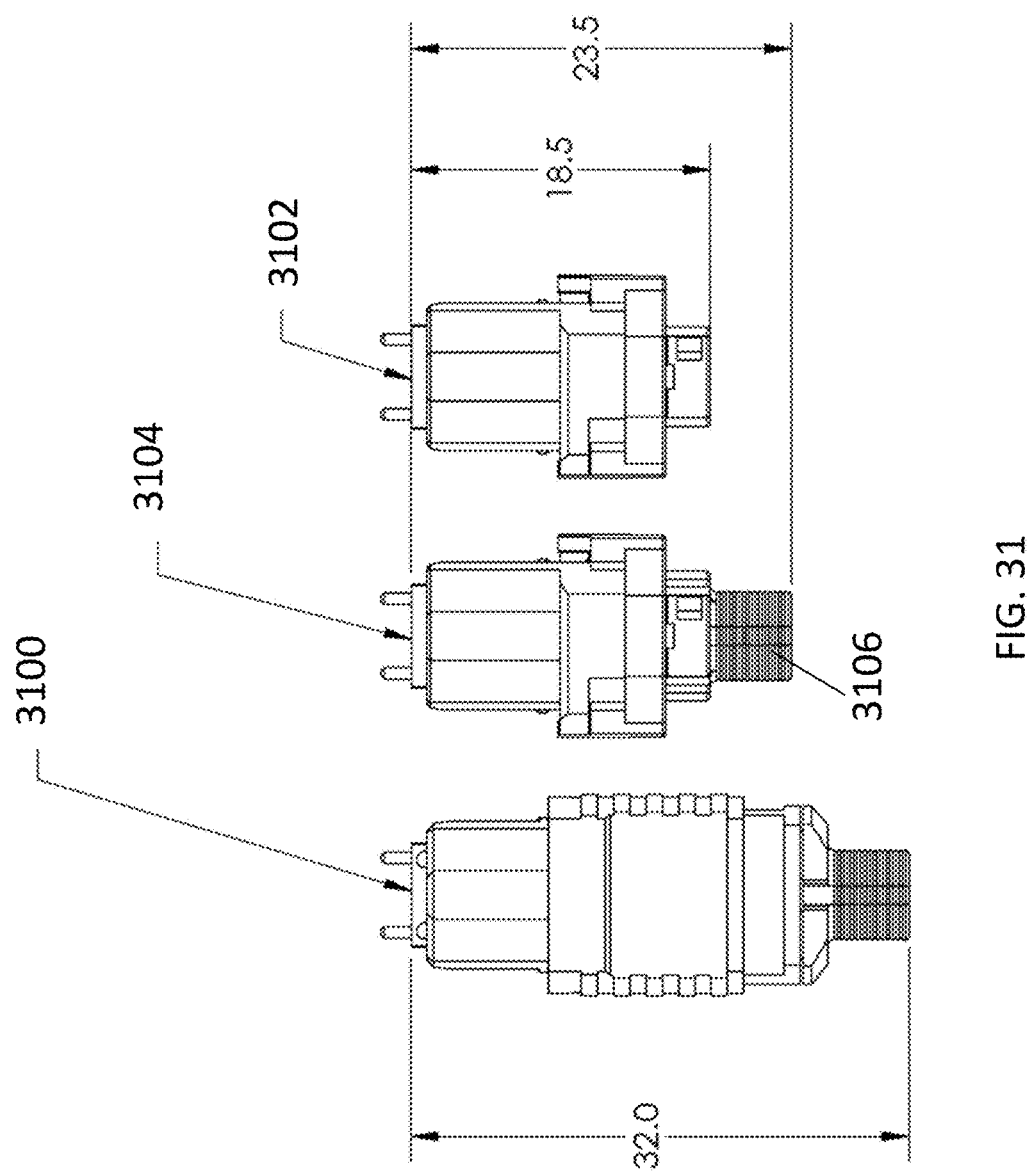
FIG. 31 illustrates the assembled length of various embodiments according to aspects of the present disclosure, in comparison with the length of a conventional MPO connector.

FIG. 31 illustrates the lengths of various embodiments of assembled connectors in comparison with the length of a conventional MPO connector 3100. Connector 3102 is one embodiment of a connector for non-reinforced (bare) optical fiber cables. The connector 3102 is configured according to features described herein, such as the embodiment described in relation with FIG. 15. As shown, in one example, the length of the connector 3102 is about 18.5 mm. Connector 3104 is another embodiment of a connector for reinforced optical fiber cables. The connector 3104 may be configured to include one or more features of connectors for bare cables, and may further include additional components, such as a reinforcing portion 3106. As shown, in one example, the length of the connector 3104 is about 23.5 mm prior to attachment to the optical fiber cable, and prior to addition of a strain relief. By contrast, connector 3100 is a conventional MPO connector for a reinforced cable, having a length of 32 mm prior to attachment to the optical fiber cable, and prior to addition of a strain relief. Various embodiments of connectors for reinforced cables disclosed herein have an assembled length less than that of a conventional connector, that is less than about 32 mm.

Figure 32:
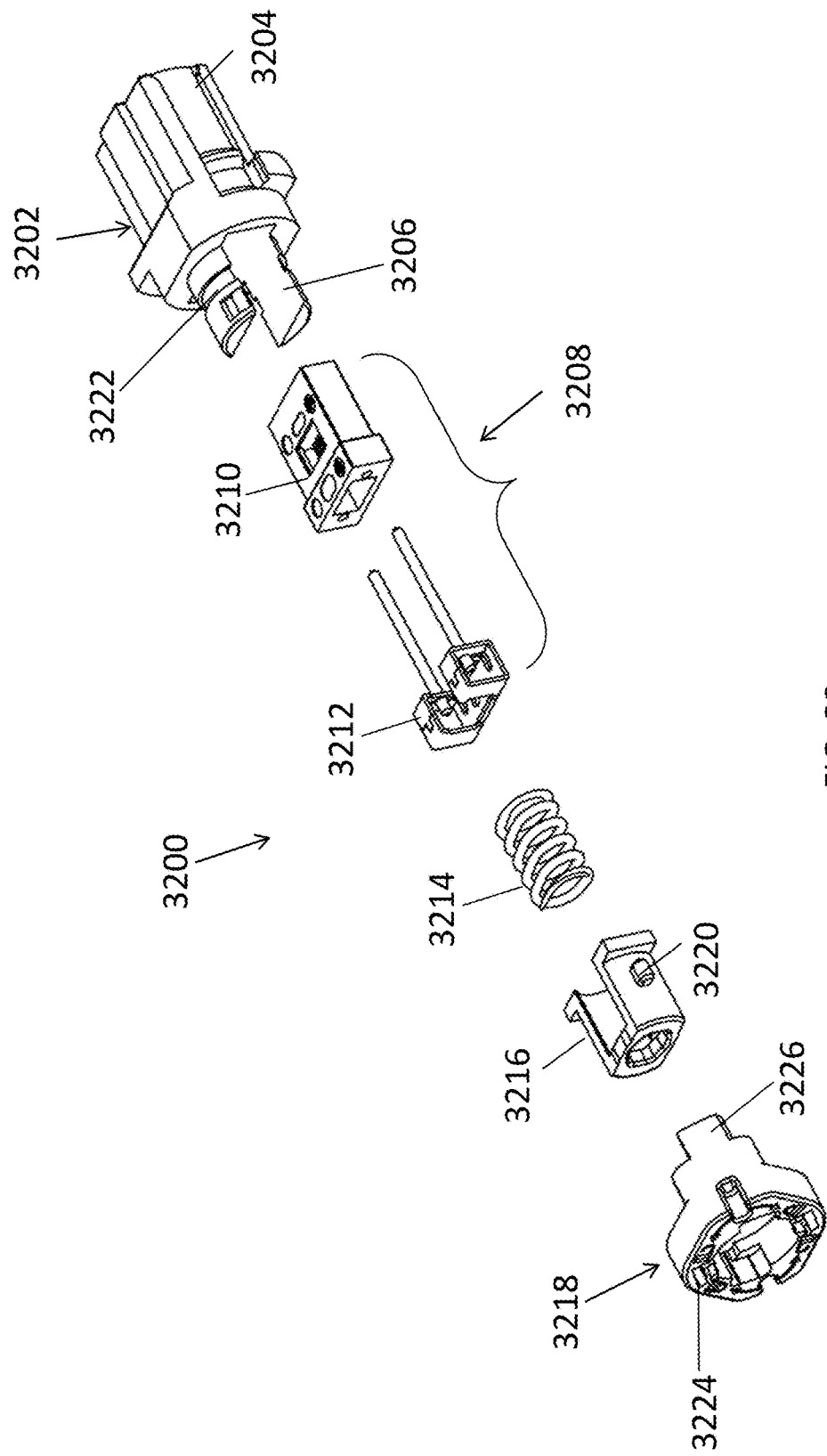
FIG. 32 is an exploded view of one embodiment of a connector for non-reinforced cables according to aspects of the present disclosure.

FIG. 32 illustrates one embodiment of a connector 3200 for a bare non-reinforced optical fiber cable. The connector 3200 includes a housing 3202 having a front portion 3204 and a rear portion 3206. The housing 3202 is configured to receive a ferrule assembly 3208 from the rear portion 3206. The ferrule assembly includes a ferrule 3210 and an alignment member 3212. The housing 3202 is further be configured to receive the ferrule spring 3214 from the rear portion 3206. In embodiments wherein the housing is configured to receive the ferrule assembly from the rear portion rather than the front portion, the connector may further include a separate interface member 3216 for the lock 3218, as shown in FIG. 32. The rear portion 3206 of the housing 3202 is configured to couple with the interface member 3216. The interface member 3216 includes a stop 3220, similar to the stop 1516 described in relation with FIG. 15. The interface member 3216 is configured to receive an optical fiber cable. The rear portion 3206 of the housing 3202 also includes a groove 3222, similar to groove 1514 described in relation with FIG. 15. The same features of the lock 1508 in FIG. 15 may also be included in the lock 3218, including flexing tabs 3224 configured to engage the grooves 3222, and the tabs 3226.

Figure 33:
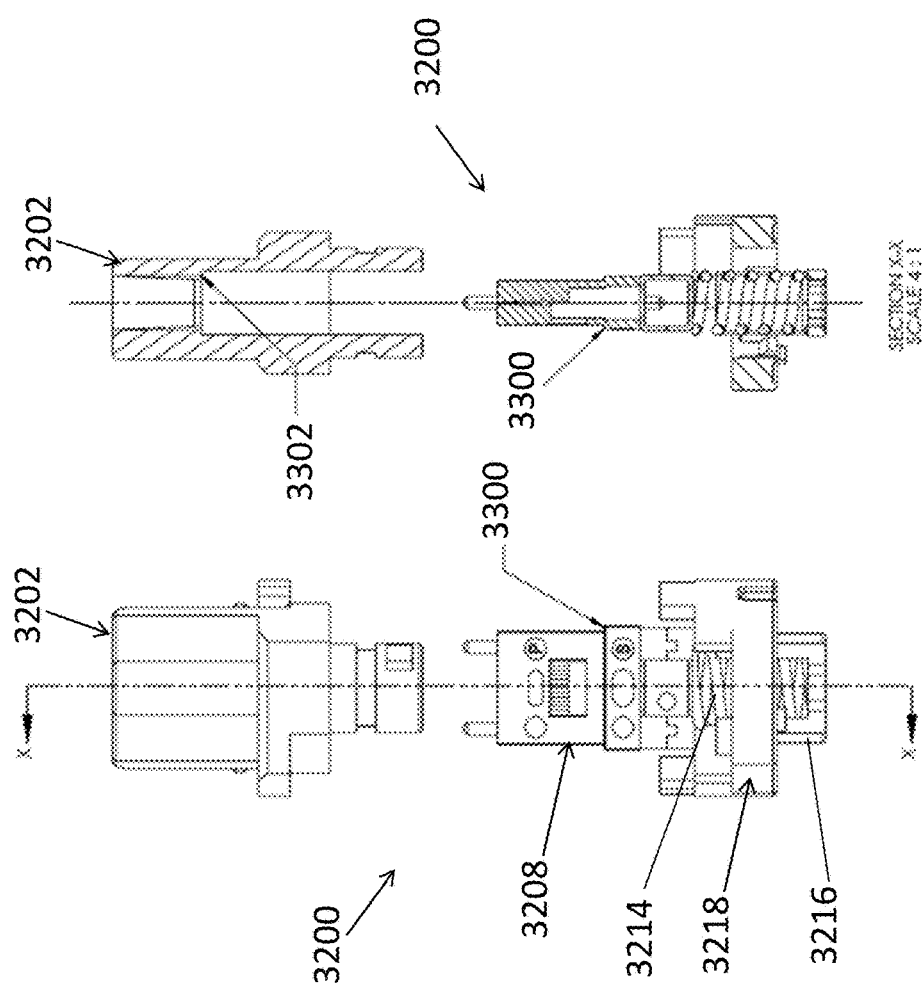
FIGS. 33A and 33B are various cross-sectional views of the embodiment shown in FIG. 32 prior to complete assembly according to aspects of the present disclosure.

FIG. 33A shows a partially assembled view of the connector 3200, including a top view of the housing 3202, and a top view of the ferrule assembly 3208 coupled to the interface member 3216, the spring 3214, and further coupled to the lock 3218. As shown, the ferrule assembly 3208 is configured to include a raised flange 3300. FIG. 33B shows a cross-sectional view of FIG. 33A along section X-X. FIG. 33B also shows the raised flange 3300. The housing 3202 includes a corresponding ferrule flange stop 3302 to facilitate proper fitting of the ferrule within the housing 3202.

Figure 34:
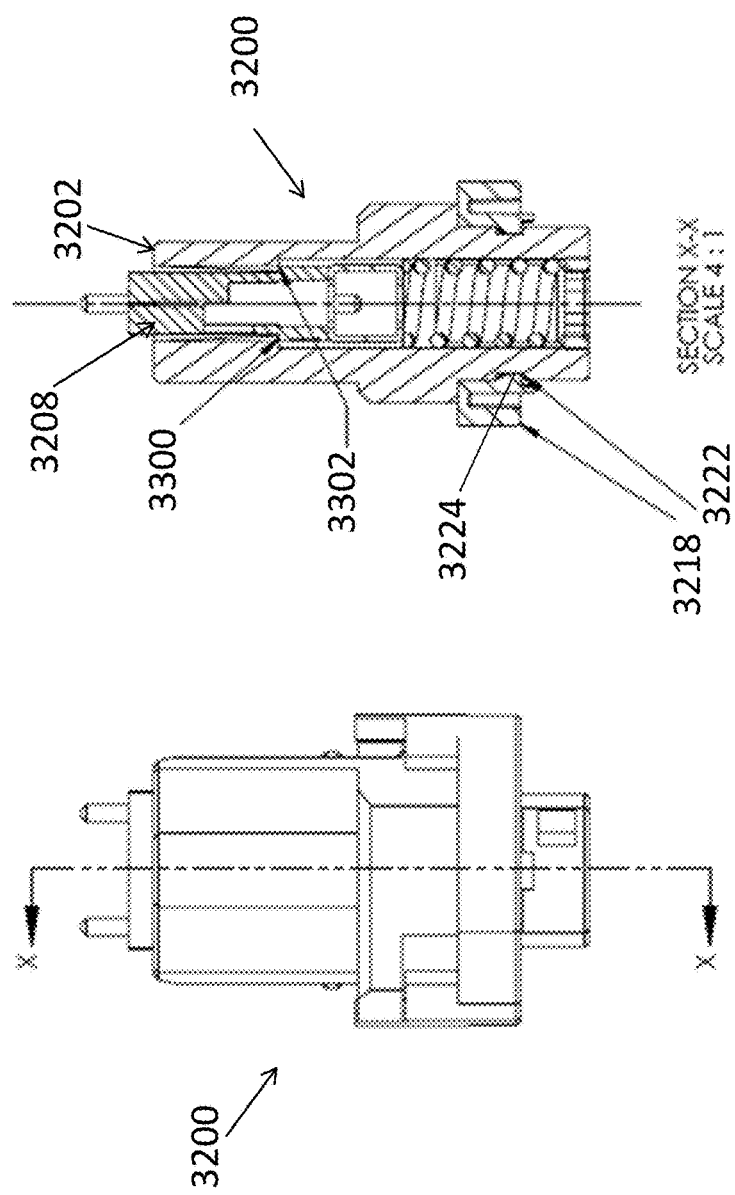
FIGS. 34A and 34B are various cross-sectional views of the embodiment shown in FIG. 32 after assembly according to aspects of the present disclosure.

FIG. 34A shows the assembled connector 3200 of FIGS. 32, 33A and 33B. The connector 3200 may be configured to have an assembled length less than about 32 mm, for example, an assembled length of about 18.5 mm or less as shown in FIG. 31. FIG. 34B shows a cross-sectional view of the connector 3200 of FIG. 34A along section X-X. FIG. 34B further shows the raised flange 3300 of the ferrule assembly 3208, and the corresponding ferrule flange stop 3302 of the housing 3202. Further, FIG. 34B shows that the flexing tab 3224 of the bayonet lock 3218 has engaged the groove 3222 of the housing 3202 so as to hold the assembly together.

Figure 35:
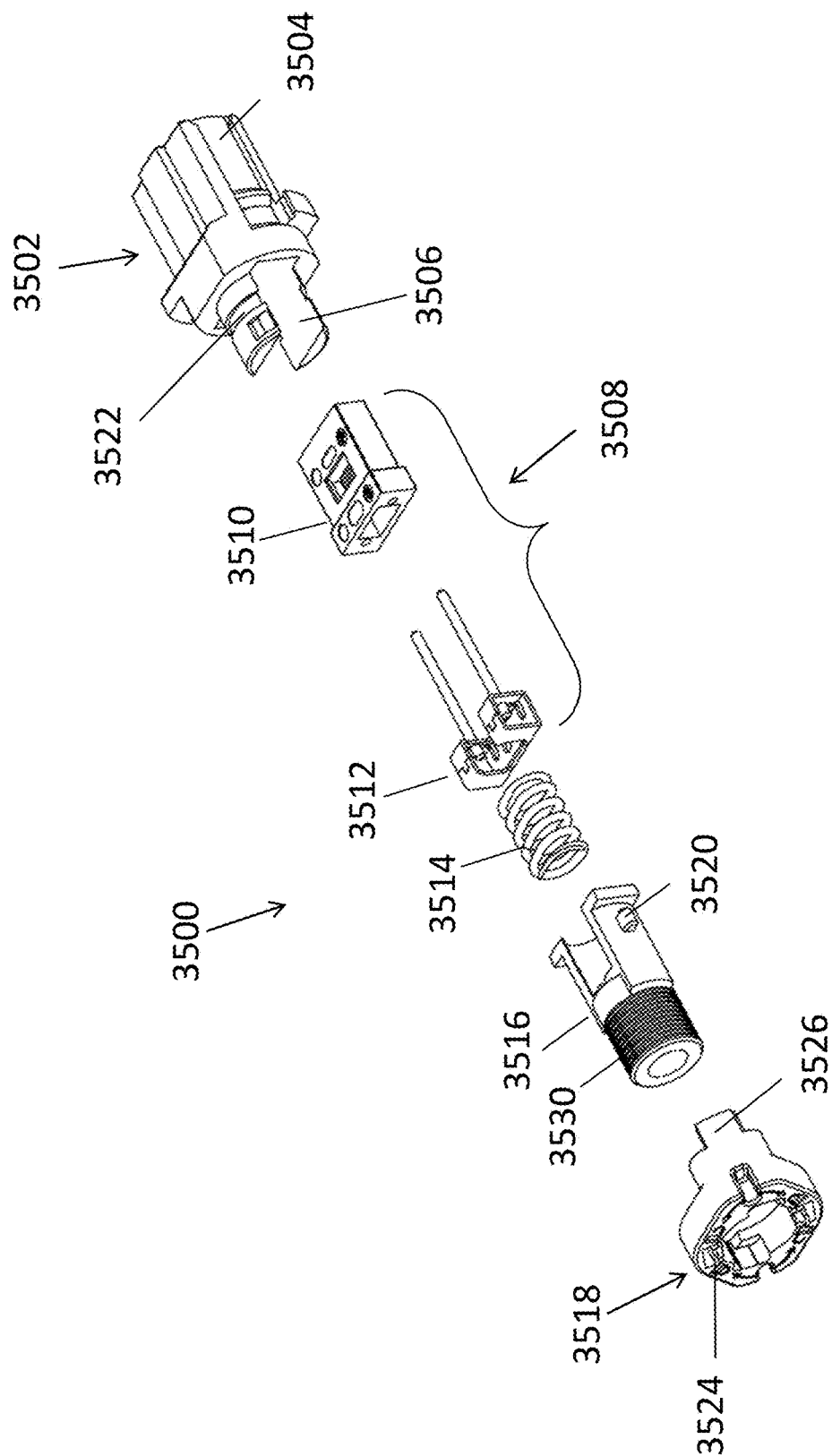
FIG. 35 is an exploded view of one embodiment of a connector for reinforced cables according to aspects of the present disclosure.

FIG. 35 illustrates one embodiment of a connector 3500 for a reinforced optical fiber cable. The connector 3500 includes a housing 3502 having a front portion 3504 and a rear portion 3506. The housing 3502 is configured to receive a ferrule assembly 3508 from the rear portion 3506. The ferrule assembly 3508 includes a ferrule 3510 and an alignment member 3512. The housing 3502 is further configured to receive the ferrule spring 3514 from the rear portion 3506. In embodiments wherein the housing is configured to receive the ferrule assembly from the rear portion rather than the front portion of the housing, the connector may further include a separate interface member 3516 for the lock 3518, as shown in FIG. 35. The rear portion 3506 of the housing 3502 is configured to couple with the interface member 3516. The interface member 3516 includes a stop 3520, similar to the stop 1516 described in relation with FIG. 15. The interface member 3516 is configured to receive an optical fiber cable. The interface member 3516 further includes a reinforcement portion 3530 so as to reinforce the optical fiber cable coupled to the connector 3500. The rear portion 3506 of the housing 3502 includes a groove 3522, similar to groove 1514 described in relation with FIG. 15. The same features of the lock 1508 in FIG. 15 may also be included in the lock 3518, including flexing tabs 3524 configured to engage the grooves 3522, and the tabs 3526.

FIG. 36A shows a partially assembled view of the connector 3500, including a top view of the housing 3502, and a top view of the ferrule assembly 3508 coupled to the interface member 3516 having a reinforcement portion 3530, the spring 3514, and further coupled to the lock 3518. As shown, the ferrule assembly 3508 is configured to include a raised flange 3600. FIG. 36B shows a cross-sectional view of FIG. 36A along section X-X. FIG. 36B also shows the raised flange 3600. The housing 3502 includes a corresponding ferrule flange stop 3602 to facilitate proper fitting of the ferrule within the housing 3502.

Figures 37A, 37B:
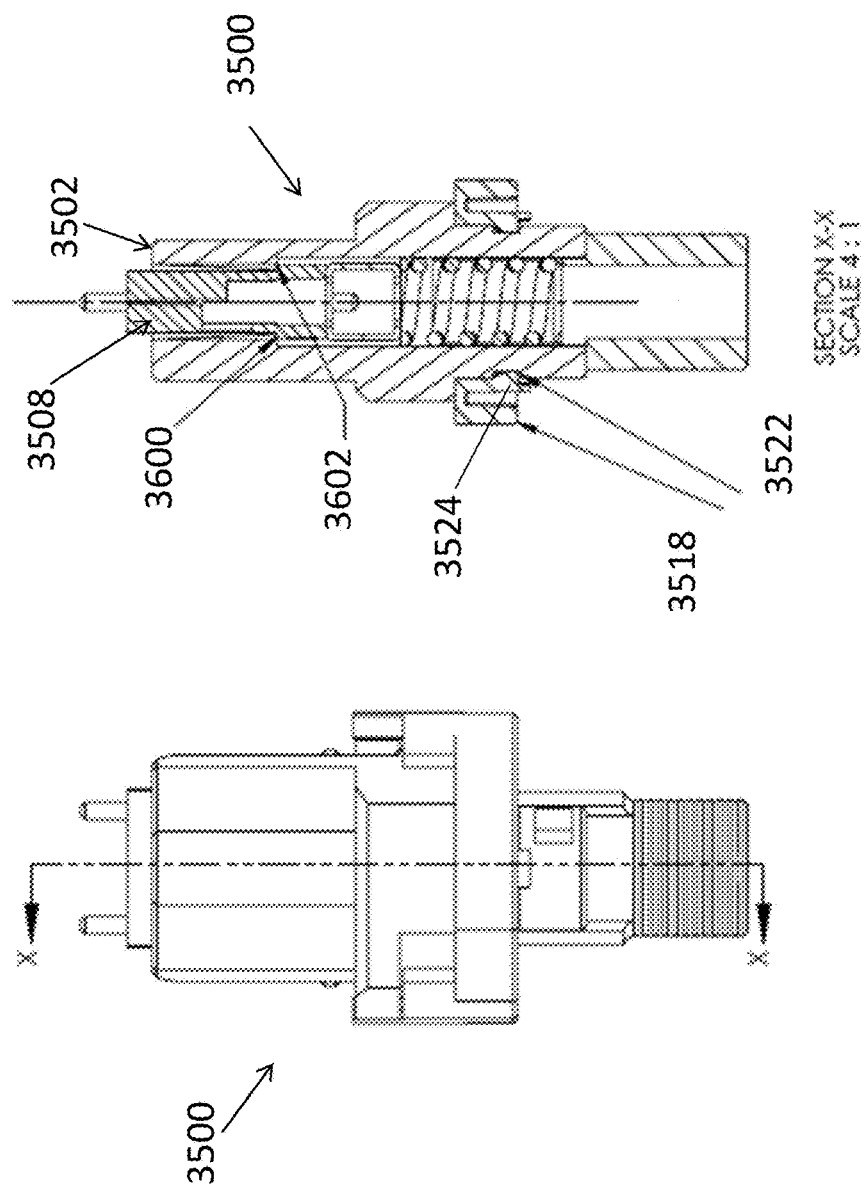
FIGS. 37A and 37B are various cross-sectional views of the embodiment shown in FIG. 35 after assembly according to aspects of the present disclosure.

FIG. 37A shows the assembled connector 3500 of FIGS. 35, 36A and 36B. The connector 3500 may be configured to have an assembled length less than about 32 mm, for example, an assembled length of about 23.5 mm or less as shown in FIG. 31. This assembled length is prior to addition of a strain relief. FIG. 37B shows a cross-sectional view of the connector 3500 of FIG. 37A along section X-X. FIG. 37B further shows the raised flange 3600 of the ferrule assembly 3508, and the corresponding ferrule flange stop 3602 of the housing 3502. Further, FIG. 37B shows that the flexing tab 3524 of the bayonet lock 3518 has engaged the groove 3522 of the housing 3502 so as to hold the assembly together. Various embodiments of connectors disclosed herein may further include a strain relief.

Various embodiments disclosed herein are compatible with known MPO adapters, and may also be configured for compatibility with new types of adapters. The adapters may be configured to be fastened to a chassis, bulkhead, panel, or any type of enclosure structure. Various embodiments may be configured with alternative types of coupling mechanisms than those described herein, for coupling the connectors to the adapters, for coupling the ferrule assemblies to the housing or for coupling the lock to the housing. Coupling mechanisms may include, for example, a threaded configuration, or a clip-type attachment.

Assembly of connectors disclosed herein may be simpler than that of conventional MT/MPO connectors, at least due to the reduced number of components and the shorter length of the connectors. Manufacturing costs can be reduced as fewer different parts need to be designed, tooled and constructed, and inventories of parts can also be minimized.

In external applications wherein the adapters and connectors may be exposed to weather, particularly rain or moisture in general, the connectors may be configured as ingress protection (IP) connectors that are waterproof. A standard for such connectors may be an OVDA connector. For weatherproof or waterproof installations, the connectors may include protective housings and seals to inhibit water penetration, and may include different levels of 'ingress protection' depending on the environment to which they will be exposed.

Various parts, components or configurations described with respect to any one embodiment above may also be adapted to any others of the embodiments provided.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A connector comprising:
   a ferrule assembly;
   a housing having a rear portion being configured to receive the ferrule assembly, the housing being further configured to couple to an adapter corresponding to the ferrule assembly;
   a lock coupled to the rear portion of the housing and configured to rotate so as to lock the housing to said adapter;

the ferrule assembly disposed within the housing, wherein the housing includes at least one catch and the ferrule assembly is secured to the housing by the at least one catch of the housing; and an interface member configured to limit rotation of the lock and having a reinforcement portion configured to reinforce an optical fiber cable received by the interface member;

wherein the housing includes at least one recess for receiving a catch of said adapter; and wherein the lock includes at least one tab configured to cover the catch of said adapter disposed in the at least one recess of the housing when the lock is in a locked position.

2. The connector of claim 1, wherein the ferrule assembly is one of an MT/MPO ferrule assembly and an MPO ferrule assembly.

3. The connector of claim 1, wherein the lock is a ring configured to rotate about the housing.

4. The connector of claim 1, the housing being the only housing of said connector.

5. The connector of claim 1, wherein the lock is disposed about the rear portion.

6. The connector of claim 1, wherein the lock includes at least one flexing tab configured to snap into a respective groove of the housing so as to couple the lock to the housing.

7. The connector of claim 1 wherein the ferrule assembly includes a raised flange and the housing includes a corresponding ferrule flange stop, the ferrule assembly being secured to the housing between the ferrule spring and the ferrule flange stop.

8. The connector of claim 1, wherein the at least one tab is configured to uncover the catch of said adapter disposed in the at least one recess of the housing when the lock is in an unlocked position, to allow decoupling the housing from the adapter.

9. The connector of claim 1, wherein the lock is further configured to rotate so as to unlock the housing from said adapter.

* * * * *